US012263548B2

(12) United States Patent
Höll

(10) Patent No.: US 12,263,548 B2
(45) Date of Patent: Apr. 1, 2025

(54) MOUNTING PRESS, GRINDING AND/OR POLISHING DEVICE, AND PRODUCTION LINE FOR MOUNTING SAMPLES AND FOR MACHINING THE MOUNTED SAMPLES

(71) Applicant: ATM QNESS GMBH, Golling (AT)

(72) Inventor: Robert Höll, Scheffau (AT)

(73) Assignee: ATM Qness GmbH, Golling (AT)

( * ) Notice: Subject to any disclaimer, the term of this patent is extended or adjusted under 35 U.S.C. 154(b) by 0 days.

(21) Appl. No.: 17/924,934

(22) PCT Filed: May 10, 2021

(86) PCT No.: PCT/EP2021/062301
§ 371 (c)(1),
(2) Date: Nov. 11, 2022

(87) PCT Pub. No.: WO2021/228754
PCT Pub. Date: Nov. 18, 2021

(65) Prior Publication Data
US 2023/0191544 A1    Jun. 22, 2023

(30) Foreign Application Priority Data

May 15, 2020  (DE) ............ 10 2020 113 321.9
May 15, 2020  (DE) ............ 10 2020 113 322.7
May 15, 2020  (DE) ............ 10 2020 113 323.5

(51) Int. Cl.
*B23P 23/04*     (2006.01)
*B24B 37/04*     (2012.01)
(Continued)

(52) U.S. Cl.
CPC ............ *B23P 23/04* (2013.01); *B24B 37/042* (2013.01); *B29C 43/04* (2013.01); *B29C 43/18* (2013.01);
(Continued)

(58) Field of Classification Search
CPC ........ B29C 2043/181; B29C 2043/182; G01N 2001/364; G01N 2001/366
See application file for complete search history.

(56) References Cited

U.S. PATENT DOCUMENTS 3,440,770 A    4/1969   Klein et al.
5,741,171 A    4/1998   Sarfaty et al.
(Continued)

FOREIGN PATENT DOCUMENTS

CN    101708590 A    5/2010
CN    102359904 A    2/2012
(Continued)

OTHER PUBLICATIONS

English Machine Translation of Description of JPH0783813 to Kiku et al. (Mar. 31, 1995).*
(Continued)

*Primary Examiner* — Timothy Kennedy
(74) *Attorney, Agent, or Firm* — Reising Ethington P.C.

(57) ABSTRACT

The invention relates to
a mounting press for automatically mounting metallographic samples in mounting material, comprising:
 a pressing unit with the press cylinder,
 a feeding device for feeding mounting material, e.g. plastic granules,
 a sample loading table with a plurality of loading stations, on each of which the operator can place a sample to be mounted,
 a control device,
a grinder and/or polisher, comprising:
 a device housing,
 at least one processing station for processing the underside of the sample, wherein the processing station
(Continued)

comprises a grinding plate with a grinding disc for grinding the underside of the sample or a polishing plate for polishing the underside of the sample, a sample feeder with a sample removal position for providing the samples for a grinding and/or polishing process, a sample deposit position for depositing the samples after the grinding and/or polishing process, a grinding-/polishing head with a sample gripper for gripping a sample, wherein the grinding/polishing head with the sample gripper moves to the sample removal position and the sample gripper grips a sample, wherein the grinding-/polishing head with the sample gripper conveys the sample to the at least one processing station and the underside of the sample is ground or polished in the processing station, and wherein the grinding-/polishing head with the sample gripper moves the sample to the sample deposit position after the grinding or polishing process and possibly further processing steps and deposits the sample there, as well as an automated production line for mounting a plurality of samples and for processing the thus mounted samples by grinding and/or polishing samples in a program-controlled overall system comprising an automated mounting press and an automated grinder and polisher.

20 Claims, 13 Drawing Sheets

(51) Int. Cl.
    *B29C 43/04*     (2006.01)
    *B29C 43/18*     (2006.01)
    *G01N 1/36*     (2006.01)
    *B29K 105/00*     (2006.01)
    *B29K 705/00*     (2006.01)

(52) U.S. Cl.
    CPC .......... *G01N 1/36* (2013.01); *B29C 2043/043* (2013.01); *B29K 2105/251* (2013.01); *B29K 2705/00* (2013.01)

(56) References Cited

U.S. PATENT DOCUMENTS

| | | |
|---|---|---|
| 2005/0032469 A1 | 2/2005 | Duescher |
| 2012/0064802 A1 | 3/2012 | Duescher |
| 2013/0232748 A1 | 9/2013 | Yang et al. |
| 2014/0336034 A1 | 11/2014 | Cartier |
| 2015/0143928 A1 | 5/2015 | Freson et al. |
| 2017/0074755 A1 | 3/2017 | Adiga et al. |
| 2018/0136094 A1 | 5/2018 | Adair et al. |
| 2018/0216016 A1 | 8/2018 | Bakas et al. |

FOREIGN PATENT DOCUMENTS

| | | |
|---|---|---|
| CN | 104330294 A | 2/2015 |
| CN | 108020453 A | 5/2018 |
| DE | 1833543 U | 6/1961 |
| DE | 102012023688 A1 | 4/2014 |
| DE | 102017109676 A1 | 11/2018 |
| FR | 1474912 A | 3/1967 |
| JP | S54126286 U | 9/1979 |
| JP | S54137192 A | 10/1979 |
| JP | S63312052 A | 12/1988 |
| JP | H04174338 A | 6/1992 |
| JP | H0783813 A | 3/1995 |
| JP | 2003094324 A | 4/2003 |
| JP | 2011251380 A | 12/2011 |
| JP | 2017533105 A | 11/2017 |
| JP | 2017533834 A | 11/2017 |
| WO | 2016156288 A1 | 10/2016 |

OTHER PUBLICATIONS

Machine translation of CN 108020453, retrieved Jun. 11, 2024 from USPTO database (Year: 2024).*

English translation of International Preliminary Report on Patentability, Int. Application No. PCT/EP2021/062300, Int. Filing Date: May 10, 2021, Applicant: ATM QNESS GMBH, Mail Date: Nov. 15, 2022.

English translation of International Preliminary Report on Patentability, Int. Application No. PCT/EP2021/062301, Int. Filing Date: May 10, 2021, Applicant: ATM QNESS GMBH, Mail Date: Nov. 15, 2022.

German Office Action, Serial No. 10 2020 11 324.3, Applicant: ATM Qness GmbH, Date: Jan. 27, 2021.

PCT Search Report, Int. Serial No. PCT/EP2021/062300, Int. Filing Date: May 10, 2021, Applicant: ATM Qness GmbH, Date: Sep. 14, 2021.

PCT Written Opinion, Int. Serial No. PCT/EP2021/062300, Int. Filing Date: May 10, 2021, Applicant: ATM Qness GmbH.

PCT Search Report, Int. Serial No. PCT/EP2021/062301, Int. Filing Date: May 10, 2021, Applicant: ATM Qness GmbH, Date: Nov. 29, 2021.

PCT Written Opinion, Int. Serial No. PCT/EP2021/062301, Int. Filing Date: May 10, 2021, Applicant; ATM Qness GmbH.

PCT Partial Search Report, Int. Serial No. PCT/EP2021/062301, Int. Filing Date: May 10, 2021, Applicant; ATM Qness GmbH, Date: Oct. 7, 2021.

German Patent Office, Serial No. 10 2020 113 321.9, Applicant: ATM Qness GmbH, Date: Jan. 21, 2021.

German Patent Office, Serial No. 10 2020 113 322.7, Applicant: ATM Qness GmbH, Date: Feb. 1, 2021.

German Patent Office, Serial No. 10 2020 113 323.5, Applicant: ATM Qness GmbH, Date: Jan. 22, 2021.

Patent Specification for DE10 2020 113 321 B4, Publication Date: Jul. 7, 2022, Applicant: ATM Qness GmbH.

Japanese Office Action corresponding to application JP2022-569529, dated Apr. 17, 2024, 5 pages.

Japanese Office Action corresponding to application JP2022-569529, dated Oct. 25, 2023, 4 pages.

* cited by examiner

MOUNTING PRESS, GRINDING AND/OR POLISHING DEVICE, AND PRODUCTION LINE FOR MOUNTING SAMPLES AND FOR MACHINING THE MOUNTED SAMPLES

TECHNICAL FIELD

The present disclosure relates to a mounting press for the automated mounting of samples in mounting material, in particular for the automated hot mounting under pressure with a plastic mounting material, a grinding and/or polishing device on a laboratory scale and a method for the plane grinding and/or polishing of the underside of samples, in particular mounted samples, as well as an automated production line for mounting a plurality of samples and for processing the thus mounted samples by grinding and/or polishing samples in a program-controlled overall system comprising an automated mounting press and an automated surface-processing device, in particular an automated grinding and polishing device.

BACKGROUND

In order to perform material tests on samples in metallography, smaller sample pieces are often mounted in a cylindrical body made from plastic material. Subsequently, the thus mounted samples are plane-ground and, if necessary, polished in order to be able to perform tests on the material, for example hardness tests or microstructure analyses, on the surface of the material sample.

A simple mounting press has a cylinder with a plunger and a manual locking device. The small metallographic samples are placed for mounting in a cylinder with a mounting granulate, e.g. of a thermoplastic material, and hot pressed, typically under a pressure of about max. 250 to 350 bar, at a maximum temperature of about 200° C. and over a period of several minutes. Such a mounting press has a control system with which the heating temperature, the heating and cooling times and the molding pressure can be set. With such a molding press, the sample mounting is carried out as follows:

1. Open the closure system and move the cylinder to the upper position,
2. Insert the sample and move the cylinder in the downward direction,
3. Scoop the mounting granules with a scooper into the cylinder,
4. Close the closure system and start the pressing process,
5. Wait for the mounting process to finish (several minutes, depending on the parameters set),
6. Open the closure system,
7. Move the cylinder in the upward direction so that the sample can be removed.

The operator repeats this process manually for each individual sample. The total direction of the sample mounting process is typically around 15 minutes, depending on the parameters set.

A modular mounting press, produced by ATM Qness GmbH, is known under the name Opal X-Press, see www.qatm.com. The basic design and mode of operation of the Opal X-Press is similar to the mounting press described above. A plurality of presses can, however, be combined and operated simultaneously, possibly with different sample diameters. Each cylinder with a plunger has a lever-operated locking mechanism at the upper end, with which the molding cavity in the press cylinder can be manually closed and locked. This modular mounting press is desirable to increase the sample throughput accordingly. However, the operator must still be present at all times to fill the individual mounting presses and remove the mounted samples.

Furthermore, a dual press with a feeding system is known as well. In terms of its operation, the dual press is similar to the mounting presses described above, but the mounting granules can be introduced via a feeder. This feeder is swiveled by hand over the press cylinder and the mounting granules are fed into the cylinder. This press has a dual design, i.e. there are two press cylinders over which the feeder can be alternately swiveled by hand.

The operator must basically be present at all times for all the systems described above. The mounting process is a time-consuming task, among other things, due to the waiting time during the pressing process, since the pressing process typically requires high pressure and a high temperature, and therefore costs the skilled laboratory worker valuable time. Furthermore, the mounting process represents a certain bottleneck in the overall sample preparation process because the mounting typically requires the most time in the overall sample preparation process. This is especially true for laboratories with a high sample throughput, i.e. when a large number of samples are to be hot-pressed.

After the sample has been mounted, it is typically ground plane with a laboratory grinding device with a rotating grinding disc and then polished. Typically, such laboratory wheel grinders or plate grinders are designed as combined grinding and polishing devices, i.e. a polishing disc can also be mounted on the grinding plate to provide a polishing function as an alternative. Such laboratory wheel grinders, as they are known, for example, from ATM Qness GmbH under the brand name Saphir and Ruben, see www.qatm.com, are used for the plane grinding and possibly polishing of the underside of mounted samples, typically for material tests, in particular hardness tests and a microstructure analysis.

Such grinders/polishers are available either in a single-spindle or a multi-spindle version. Manual grinders-/polishers basically have a housing with a tray, a drive motor and a grinding plate. In simple grinders-/polishers, the mounted sample can be pressed down and ground by hand. Semi-automatic grinders/polishers also have a device head, sometimes referred to as a polishing head, with a rotating pressure pad and a sample holder, in which typically four to six mounted samples can be inserted and possibly clamped. In the case of single contact pressure, the samples are only inserted into the sample holder and carried along by said holder. Each individual sample is pressed against the grinding plate by a pneumatic cylinder or a spring. In the case of central contact pressure, the entire sample holder is pressed against the grinding plate and the samples are firmly clamped in the sample holder for this purpose. In automated systems, the samples are typically clamped in place, as these systems usually work with central contact pressure.

The insertion and, if necessary, clamping of the samples is a manual activity and the samples must be aligned very precisely and flat in a corresponding fixture, which is time-consuming.

A conventional semi-automated grinder/polisher has a magazine for, for example, 16 grinding discs, which can be placed on the grinding plate for the individual processing steps performed by an automated changing system. First, coarser abrasive grit is used, which then becomes finer, and the polishing discs follow at the end. Usually, 4 to 6 grinding and polishing steps are required to produce the finished sample surface. After each processing step, one or two cleaning steps are performed with water, methanol or in an ultrasonic bath.

This device is relatively compact and inexpensive. However, only 6 samples are automatically produced in a sample holder before the sample holder has to be changed. Furthermore, the grinding and polishing discs are changed between the grinding and polishing steps after each step. Furthermore, the samples are manually clamped into the sample holder and aligned.

In another basically similar variant, the samples are clamped in a holder and the grinding discs are changed as well. In this machine, however, more than one sample holder can be loaded, and it has two cleaning stations. This machine has its increased size.

A grinder and polisher with a plurality of grinding-/polishing stations is known from ATM Qness GmbH. This machine can be modularly equipped with a plurality of grinding-/polishing discs, with cleaning stations and a plane grinding device for dressing the samples. There is also a magazine with various grinding and polishing discs. The machine comprises two polishing heads, each of which can hold one sample holder and simultaneously process two sample holders with a plurality of samples. The machine has a sample holder magazine that can accommodate up to 12 sample holders. The 12 sample holders are automatically taken over or changed and clamped by the machine. The samples must, however, be manually clamped into the sample holders and aligned flat. Due to the modular design, the machine can be configured with 4 but also with 6 or 8 stations. A high sample throughput can be achieved with this grinder/polisher, and the grinder/polisher is, due to the modular design, easily adaptable to user requirements. The acquisition is, however, associated with relatively high investment costs. Furthermore, the machine has a rather large space requirement.

Another machine is known in which a plurality of sample holders is arranged on a feed belt and conveyed into a first unit. There, they are first dressed (flattened) over a grindstone, cleaned, and then the first fine grinding process takes place. The sample holder is then conveyed to a second unit, where two polishing steps with an intermediate and a final cleaning take place. Both workstations operate simultaneously, i.e. while the first sample holder is being polished in the second unit, the first unit is already working on the next sample holder.

This machine also has a modular design and any number of units can be combined. There are the high acquisition costs and a very large space requirement, especially when a plurality of units is combined.

GENERAL DESCRIPTION OF THE PRESENT DISCLOSURE

The present disclosure is to provide a mounting press for mounting samples in mounting material that is easy to operate and that requires little skilled work time from the operator.

The present disclosure is to provide a mounting press for automatically mounting a plurality of samples in mounting material.

The present disclosure is to provide a mounting press for automatically mounting a plurality of samples in mounting material, which allows the operator to prepare a plurality of samples for mounting in one operation, with the mounting press subsequently being able to automatically mount the prepared samples in the absence of the operator and make them available for further processing, e.g. plane grinding and polishing.

The present disclosure to provide a grinder and/or polisher for plane grinding and/or polishing the underside of a sample, in particular a mounted sample, which provides a high efficiency and convenience for the operator.

The present disclosure is to provide a grinder and/or polisher for plane grinding and/or polishing the underside of a sample, in particular a mounted sample that is inexpensive and requires little space in the laboratory and yet has a high sample throughput.

The present disclosure is to provide a grinder and/or polisher for plane grinding and/or polishing the underside of a sample, in particular a mounted sample, due to which the dressing/flattening of the samples can be dispensed with.

The present disclosure is to provide a grinder and/or polisher for plane grinding and/or polishing the underside of a sample, in particular a mounted sample, which combines several properties, namely low cost, high working time efficiency, high sample throughput and low space requirement.

The present disclosure to simplify the production of mounted samples, prepared for a hardness test, for a microstructural analysis or for other metallurgical testing.

The present disclosure is to provide a production system which is capable, without any operator intervention between samples, of automatically both mounting the samples and then processing the underside of the mounted samples, in particular grinding and possibly polishing.

The present disclosure is to provide a production system for mounting, grinding and, if necessary, polishing a plurality of samples, which leads to efficiency in terms of the operator's working time that is required on the one hand and low space requirements in the laboratory as well as low costs on the other.

The present disclosure has the subject matter of the independent claims. Preferred embodiments are the subject matter of the dependent claims.

One aspect of the present disclosure relates to a mounting press for mounting or embedding metallographic samples in mounting or embedding material. The diameter of such mounted samples may be, for example, in a range of 20 mm to 60 mm, in order to better handle, for example, small pieces of metal in connection with material tests, such as hardness tests or microstructure analyses, and the corresponding preparation steps.

The mounting press comprises a pressing unit with a sample receiving position for a sample to be mounted and a press cylinder in which the sample is pressed together with for example plastic mounting material by means of a plunger under high pressure and possibly high temperature in such a way that the sample is firmly mounted in the mounting material after the completion of the pressing process. A plunger driven by a spindle drive or hydraulically, for example, can be used as the plunger drive. The press cylinder is preferably heated in order to carry out the pressing process at a high temperature, in particular to melt the plastic mounting material, which can take place, for example, in the range between 100° C. and 300° C. The press cylinder may also be cooled to achieve a faster cooling. In metallography, this process is referred to as hot mounting or warm mounting.

Furthermore, the mounting press comprises a feeding device for feeding the mounting material into the press cylinder. When the mounting material is fed in, the sample to be mounted lies in particular loosely on the plunger in the press cylinder and the mounting material is trickled as mounting granules, in particular plastic granules, from above onto the sample and the plunger. The feeding device can be connected to one or more storage containers from which the mounting granules are conveyed into the feeding device, e.g. in each case by an auger.

The mounting press further comprises a sample loading table with a plurality of loading stations or loading places, on each of which the operator can place a sample to be mounted, i.e. intended for mounting. The sample loading table can be, for example, a rotary table with a plurality of loading stations on its outer periphery.

Furthermore, a control device is comprised which automatically controls the mounting press in a program-controlled manner, preferably at least the sample loading table, the pressing unit and the feeding device, in such a way that a plurality of pressing processes can be carried out in succession in a fully automated manner without any intermediate operator intervention, in particular after the sample loading table has been loaded with a plurality of samples to be mounted. For this purpose, the control device is designed to automatically control the mounting press in a plurality of clock cycles, each of which comprises the following steps:

Step a): The control device controls the sample loading table so that it moves one of the loading stations with one of the samples to be mounted to the sample receiving position of the pressing unit.

Step b): The control device then controls the pressing unit in such a way that the sample to be mounted, the loading station of which was moved in step a) to the sample receiving position, is automatically inserted from the sample mounting position into the press cylinder. Furthermore, the control device controls the feeding device so that the mounting material is automatically fed into the press cylinder onto the sample to be mounted.

Step c): Subsequently, the control device controls the pressing unit so that the pressing process is carried out under pressure and, if necessary, increased temperature in order to produce a mounted sample.

Step d): The control device then controls the pressing unit so that the mounted sample produced in step c) is ejected from the press cylinder.

Thereafter, the control device then controls the mounting press so that the clock cycle with steps a) to d) is automatically repeated until all the samples that were placed on the loading stations have been mounted. The sample loading table is controlled by the control device in such a way that it moves one loading station further with each cycle. If necessary, an inspection device can be provided which, prior to the program-controlled insertion of the sample to be mounted into the press cylinder, checks whether the loading station currently at the sample receiving position is actually loaded. If not, the control device can automatically control the sample loading table so that the steps b) to d) are omitted for this cycle and the next loading station is moved to the sample receiving position. When all samples have been mounted, the control device can automatically switch off the mounting press, e.g. when as many clock cycles have been completed as there are loading stations available.

With regard to the mounting press, the operator therefore only needs to load the sample loading table with a plurality of samples, e.g. several tens of samples, by placing one sample to be mounted on each loading station. This can still be done manually if necessary, but does not require any waiting time and can therefore be done relatively quickly in one step. The operator then starts the control program of the control device, which automatically executes a plurality of the clock cycles described above in order to automatically mount one sample after the other without any operator intervention. Each cycle requires a certain amount of time, e.g. about 15 minutes, so that the mounting of, for example, 32 samples in 32 cycles can take a total of about 8 hours, i.e. an entire shift. During the automated execution of the clock cycles, however, no operator intervention is required, so that the operator can load the sample loading table and start the control program in the evening, for example, and find all samples fully mounted the next morning. This can result in an enormous saving of skilled working time.

According to one embodiment, the sample loading table is designed as a cycle table, preferably as a rotary cycle table, wherein the loading stations are arranged in a peripheral annular region of the rotary cycle table and the rotary cycle table is rotated further in each cycle by a predefined angular step in order to move the next loading station to the sample receiving position.

Preferably, the press cylinder has a lower first opening and an upper second opening. This allows the automated introduction of the sample and the feeding of the mounting material to be carried out at the two axially opposite ends of the press cylinder. Preferably, the sample is introduced into the press cylinder from below, i.e. through the lower first opening, and the mounting material is fed into the press cylinder from above, i.e. through the upper second opening.

Preferably, the pressing unit has an upper closure slide, and the control device is adapted to control the upper closure slide so that the upper closure slide automatically closes the upper second opening of the press cylinder after the mounting material has been fed in, in order to subsequently be able to carry out the pressing process, i.e. after step b) and before step c).

According to a preferred aspect of the present disclosure, a plunger, which is designed as a press plunger for the press cylinder, is located in each of the loading stations as a placement surface for the sample to be mounted. For this purpose, a recess may be formed in the upper side of the sample loading table at each of the loading stations, for example, and a lower placement surface may be provided in each of the recesses, for example, an annular surface as a placement edge with a central opening. The plungers inserted in the sample loading table thus have a dual function, namely they serve on the one hand as a placement surface on which the operator places the samples during the preparatory loading stage and on the other hand as press plungers for the respective pressing process. Preferably, the pressing unit has a plunger drive, e.g. with a plunger rod, with the plunger drive or the plunger rod coupling to the respective plunger in the sample receiving position in order to lift the plunger with the sample to be mounted lying thereon out of the loading station and to push the plunger from below, through the lower first opening into the press cylinder, and the respective plunger acting as a press plunger in the subsequent pressing process. In other words, each sample has its own press plunger on which it is placed in the preparatory mounting step.

Preferably, the pressing unit has an automated sample ejector. After the pressing process, the then mounted sample is moved upward out of the press cylinder by the plunger drive or the plunger rod and the plunger, and the control device controls the sample ejector in such a way that the sample ejector automatically ejects the mounted sample moved upward out of the press cylinder from the pressing unit.

Preferably, the sample ejector pushes the mounted sample radially to the axis of the press cylinder down from the upwardly moved plunger in order to eject the mounted sample. For this purpose, the plunger preferably moves upward until the mounted sample is completely ejected from the press cylinder, but the plunger is still radially secured in order to be able to overcome any adhesion between the mounting material and the plunger surface.

After the sample has been ejected, the control device controls the mounting press so that the plunger drive or the plunger rod moves back down together with the plunger and the empty plunger is deposited again in the loading station of the sample mounting table before the next loading station with the next plunger and the next sample is moved to the sample receiving position to start the next cycle.

The lower part of the mounting press has an insertion opening for the sample loading table. In the case of a rotary table, the insertion opening is preferably U-shaped in that the mounting press has a laterally open recess under the press cylinder. In the case of a linear sample loading table, the insertion opening can also be designed as a continuous opening through which the linear sample loading table is pushed. This way, the sample loading table can move at least partially in the recess of the mounting press and cyclically introduce the loading stations with the samples to be mounted into the laterally open recess one after the other in order to move one sample to be mounted under the press cylinder.

According to a preferred embodiment, the mounting press comprises at least a first and a second storage container for storing different first and second mounting material. Both storage containers are connected to the feeding device, so that the feeding device can feed mounting material from both the first and the second storage container into the press cylinder, with the feeding of the first and second mounting material being controlled by the control device in order to automatically feed the first and/or second mounting material into the press cylinder, preferably one after the other, in each case in a predefined quantity. This way, a two-layered mounting can be produced without any operator intervention, e.g. from a higher-quality mounting material in the lower region and from a lower-cost mounting material in the upper region. The mounting material can be introduced into the rotary feeder, for example from the first and/or second storage container, by means of a first and/or second auger. The storage containers with the mounting material are preferably each equipped with an automated level monitor that communicates with the control device. If there is no more mounting material in one of the storage containers, an associated level sensor reports this condition to the control device, which in response stops the machine and preferably provides an error message (e.g.: No mounting material in the container) to the operator via a display and may also turn on a red signal light.

One aspect of the present disclosure relates to a method for mounting a plurality of samples in mounting material with a mounting press, wherein a sample loading table with a plurality of loading stations is loaded with a plurality of samples to be mounted, optionally manually, in a preparatory step. After the sample mounting table has been loaded with the plurality of samples to be mounted, the samples are automatically mounted one after the other in clock cycles with the following steps in a program-controlled manner.

Step a): One of the loading stations is moved to a sample receiving position of a pressing unit in a program-controlled manner with the sample to be mounted previously placed thereon.

Step b): The sample from step a) is inserted from the loading station at the sample receiving position into a press cylinder of the pressing unit and mounting material is fed into the press cylinder in a program-controlled manner.

Step c): The mounting material and the sample are pressed in the press cylinder in a program-controlled manner to produce a mounted sample.

Step d): The mounted sample is ejected from the press cylinder in a program-controlled manner. The clock cycle with steps a) to d) is repeated in a program-controlled manner until a plurality of samples has been mounted.

Preferably, the samples are introduced into the press cylinder from below and the mounting material is fed into the press cylinder from above.

After the mounting material has been fed in, the press cylinder is preferably automatically closed at its upper end in a program-controlled manner in order to subsequently carry out the pressing process automatically in a program-controlled manner.

In the preparatory mounting step, the samples to be mounted are preferably each placed on their own plunger at the loading stations, with the plunger acting as a press plunger in the press cylinder during the subsequent mounting process. In step b), the respective sample together with its own press plunger is pushed axially from below into the press cylinder, e.g. by coupling a plunger rod to the respective press plunger under the press cylinder and pushing the respective press plunger with the respective sample upwards into the press cylinder.

After step c), the plunger with the now mounted sample is moved upwards, with the mounted sample being moved out of the press cylinder in order to be pushed from the plunger by the sample ejector radially to the axis of the press cylinder in step d) in order to eject the sample.

After step d), the empty plunger is moved back down and placed back on the placement station before the next placement station is moved to the sample receiving position with the next plunger and sample to begin the next cycle.

Preferably, therefore, the sample loading table, controlled by the control device, moves the loading stations with the plungers and the samples to be mounted placed thereon cyclically one after the other under the press cylinder in order to then axially insert the respective plunger with the sample from below into the press cylinder. After the pressing process, the plunger is again moved axially downward out of the press cylinder and placed again on the loading station before, in the next cycle, the next loading station with the next plunger and the next sample moves under the press cylinder in order to be inserted into the press cylinder.

Preferably, at least two different mounting materials are automatically fed into the press cylinder one after the other in a program-controlled manner to produce a two-layered mounting.

One aspect of the present disclosure relates to a mounting press for mounting samples in mounting material, in particular having the features described above, comprising
  a press cylinder having a vertical axis,
  a plunger on which a sample to be mounted can be deposited, and
  a feeding device for feeding the mounting material into the press cylinder,
    wherein the press cylinder has a lower first opening and an upper second opening, and the sample to be mounted with the plunger is inserted into the press cylinder through the lower first opening, and the mounting material is fed into the press cylinder through the upper second opening.

In fact, it has proven to be desirable to introduce the sample with its own plunger into the press cylinder from one axial side, namely from below, and to feed the mounting material from the other axial side, namely from above. This design, together with but also independently of the other features described above, can simplify the pressing process, even if it can be somewhat more complicated from a design aspect than introducing the sample and mounting granules from above.

Accordingly, the present disclosure also relates to a method for mounting samples in mounting material, in particular having the features described above and comprising the following steps:

Inserting a plunger with a sample to be mounted previously deposited thereon into a press cylinder through a lower first opening of a press cylinder, Feeding the mounting material through an upper second opening of the press cylinder onto the plunger with the sample placed thereon, Closing the upper second opening of the press cylinder and pressing the sample with the mounting material in the press cylinder, and Ejecting the mounted sample from the press cylinder.

A further aspect of the present disclosure relates to a mounting press for mounting samples in mounting material, in particular having the features described above, comprising a pressing unit with a press cylinder, a plunger drive for driving a plunger for performing a pressing operation in the press cylinder, a sample loading table with a plurality of loading stations, and preferably a plurality of plungers with a plunger top and formed as press plungers for the press cylinder, wherein the plungers can each be deposited in one of the loading stations with the top of the plunger serving as a depositing surface, in such a way that the operator can deposit a sample to be mounted on the top of the plunger, wherein the plunger drive can be alternately coupled to the plungers in order to mount a plurality of samples in clock cycles, in that the plunger drive couples to one of the plungers per clock cycle, and the respective sample to be mounted is introduced into the press cylinder for the pressing process with its own plunger.

Embodiments of a grinder and/or polisher and an automated production line as well as the associated methods are described in further detail below.

Grinder and/or Polisher

The disclosure further relates to an automated laboratory-scale grinder and/or polisher for plane grinding and/or polishing the underside of a sample, in particular a mounted sample. The grinding and/or polishing serves in particular to prepare samples for testing that is performed on the mounted sample, e.g. for hardness tests performed on in particular mounted metallographic samples.

The grinder and/or polisher comprises a device housing in which drive motors for grinding and/or polishing plates, control devices etc. can, for example, be accommodated and on the upper side of which trays can be formed in which the grinding and/or polishing plates can be arranged. Furthermore, the housing can accommodate a machine frame on which a movable device head, often referred to as a grinding-/polishing head, can be suspended in a horizontally movable manner.

According to one aspect of the disclosure, at least one surface-processing station for an abrasive processing of the underside of the sample is present in the device housing, which is designed in particular as a grinding station or as a polishing station, i.e. has a rotating and/or vibrating grinding plate with a grinding wheel or grinding disc for grinding the underside of the sample or a rotating and/or vibrating polishing plate for polishing the underside of the sample.

Further comprised is a sample feed with a sample removal position for feeding and providing the samples for a grinding and/or polishing process. The samples are provided individually and loosely, in particular successively sample by sample. Preferably, the mounted samples are thus processed individually and are preferably not clamped in a sample holder in multiples. The sample feed can be designed, for example, as a chute or a conveyor belt, by means of which mounted samples slide or are automatically conveyed individually successively one after the other to the sample removal position, where they can be removed one by one.

Further comprised is a sample deposit position for depositing the samples after the grinding and/or polishing process, into which the samples can be deposited individually after the completion of the grinding and/or polishing process in the grinding and/or polishing station. The sample deposit position can, for example, in turn be designed as part of a chute or a further conveyor belt, so that the samples also automatically leave the sample deposit position successively one after the other, for example in order to be collected in a sample collection device. It is also possible, however, for the grinder and/or polisher to comprise a plurality of sample removal positions and/or a plurality of sample deposit positions, with the grinding-/polishing head moving to the sample removal positions and the sample deposit positions one after the other in order to successively process all the samples.

The grinding-/polishing head comprises a sample gripper for gripping and handling a sample, preferably a single or individual mounted sample.

In order to grind and/or polish the mounted sample, the grinding-/polishing head with the sample gripper first moves to the sample removal position in a program-controlled manner and the sample gripper preferably grips a single or individual mounted sample there and holds said sample in place.

The grinding-/polishing head with the sample gripper then moves to the at least one surface-processing station in a program-controlled manner and feeds the mounted sample to the at least one surface-processing station so that the underside of the sample can be abrasively processed, in particular ground or polished, in the surface-processing station. The sample gripper holds the individual mounted sample in place and, if necessary, rotates continuously, in addition to the rotation and/or vibration of the grinding disc or polishing disc of the abrasive surface-processing station.

After the grinding or polishing and, if necessary, further surface-processing steps, the grinding-/polishing head with the sample gripper moves to the sample deposit position in a program-controlled manner in order to feed the individual mounted sample to the sample deposit position and finally releases the mounted sample at the sample deposit position in a program-controlled manner in order to deposit said sample at the sample deposit position.

Thus, the entire processing procedure from gripping the mounted sample to depositing the mounted sample runs automatically in a program-controlled manner, without the operator having to intervene between samples.

Preferably, the grinder and/or polisher comprises a linear displacement device, e.g. with a motor-driven linear slide controlled by the program control device, which is suspended e.g. from the machine frame and by means of which the grinding-/polishing head is displaced horizontally in order to move back and forth between the sample removal position, the at least one surface-processing station and the deposit position.

Furthermore, the grinding-/polishing head preferably comprises a vertical linear displacement device, e.g. with a motor-driven linear slide controlled by the program control device, by means of which the sample gripper is moved vertically in order to pick up the mounted sample in the sample removal position, in order to lower the mounted sample at the at least one surface-processing station and press it against the grinding disc or polishing disc, and in order to deposit the mounted sample at the sample deposit position. This can be realized, for example, with a spindle drive.

The grinder and/or polisher can handle one mounted sample after the other in a fully automated manner and grind and/or polish their underside flat so that the operator does not need to intervene during the ongoing grinding and/or polishing process of a plurality of successively processed mounted samples. The operator can load the grinder and/or polisher, for example, with a desired quantity of mounted samples, the total processing time of which can take several hours, in the evening, and the next morning all the finished mounted samples are individually ready for removal in the sample collection unit. For the operator, this means high efficiency and convenience for the plane grinding and/or polishing mounted samples.

A further effect is the possibility of a compact design, among other things when a plurality of different surface-processing stations, for example a grinding station and a polishing station or even a plurality of grinding stations with different abrasive grit sizes and/or, for example, a plurality of polishing stations with different polishing suspensions are installed in the same device housing and are accessed by the same grinding-/polishing head. Preferably, all grinding and polishing stations are installed in the same device and are preferably operated by the same grinding/polishing head. A device could, however, also comprise two or more grinding-/polishing heads, each with a sample gripper, that alternately move to the same surface-processing stations in the same device.

Preferably, the sample gripper is adapted to automatically grip mounted metallographic samples individually without multiple sample holders, in a program-controlled manner, in particular without any user intervention. The outer circumferential surface of the mounted metallographic sample is preferably cylindrical and formed from thermoplastic or thermoset mounting material by pressing the sample into a press cylinder of a hot mounting press. In particular, the sample gripper is adapted to grip the cylindrical lateral surface of the hot-pressed plastic mounting material of the mounted metallographic sample and to hold said sample in a frictionally engaged manner, e.g. by means of a plurality of gripper fingers pressing radially against the cylindrical lateral surface. Additional aids, such as cups with special projections for gripping with a robot arm, can be dispensed with during the hot mounting process. The outer lateral surface of the cylindrically mounted metallographic sample thus preferably consists of the plastic material that is hot-pressed in the press cylinder of the mounting press.

With regard to sample throughput, it may initially seem counterproductive to handle the mounted samples individually. A high sample throughput can still be achieved, however, especially if all grinding and polishing steps are performed one after the other in a fully automated manner, preferably in the same device, namely in particular if the grinder and/or polisher operates in a fully automated manner over a longer period of time, e.g. overnight, without any user intervention. High efficiency can thus be achieved in particular in terms of the ratio between the sample throughput and the user's effective working time.

Furthermore, especially if the mounted samples are gripped individually and directly by the sample gripper and held in place throughout the machining process, it may not be necessary to dress the mounted samples with a grindstone or planarizing, thus further simplifying the process.

An synergy between low cost and small space requirement on the one hand, and yet an effective use of working time and a high sample throughput on the other hand, can, in particular, be achieved, which is an parameter in a laboratory, for example regarding the preparation of mounted samples for hardness tests or a microstructure analysis.

The sample gripper can be designed, for example, as a finger gripper with at least three gripper fingers, the gripper fingers being radially movable and gripping and holding the mounted sample in place on the circumferential lateral surface of the mounting plastic by radially closing the gripper fingers. Finger grippers, e.g. three-finger grippers, have proven suitable for gripping individual mounted samples.

Preferably, the gripping fingers each have a horizontal setoff, so that, when the sample gripper is lowered, the setoffs of the gripping fingers act as vertical stops against the top of the sample to grip the mounted sample as horizontally as possible.

This makes it possible for the mounted sample to be gripped precisely in a manner, which may help eliminate the need for dressing. Furthermore, the setoffs on the sample gripper also form a counter-bearing against the contact pressure during the grinding and/or polishing process, so that the radial gripping force can be kept within acceptable limits and an undesirable slipping of the mounted sample during the grinding and/or polishing process can still be avoided.

Preferably, the sample gripper rotates continuously during the grinding and/or polishing process. For this purpose, the grinding-/polishing head comprises a drive shaft which is driven in rotation by a motor and the sample gripper is attached to the lower end of the drive shaft. Accordingly, the sample gripper rotates with the gripped mounted sample during the grinding and/or polishing process at a predefined speed, in particular simultaneously with the rotation or vibration of the grinding and/or polishing disc. The sample gripper is preferably also rotated in a program-controlled manner, in particular activated for the grinding and/or polishing process in a program-controlled manner, after the mounted sample has been gripped in the sample removal position, and is preferably terminated again in a program-controlled manner before the mounted sample is deposited in the sample deposit position.

The axis of symmetry of the mounted sample is preferably coaxial with the axis of rotation of the sample gripper when the mounted sample is gripped by the sample gripper, so that the mounted sample rotates about its axis of symmetry.

As a result, relatively small grinding and/or polishing discs can be used, which has an effect on the size of the grinder and/or polisher and, moreover, the abrasive of the grinding discs may be utilized in an efficient manner. Preferably, the grinding discs and/or the polishing discs in the surface-processing stations have a diameter of less than or equal to 300 mm, preferably less than or equal to 250 mm, preferably in the range of 80 mm to 250 mm, preferably in the range of 200 mm+/−50 mm. In the case of polishing stations with a horizontally oscillating vibrating plate, the polishing discs can possibly be even smaller, e.g. have a diameter of at least 50 mm, preferably between 50 mm and 200 mm, preferably between 120 mm and 200 mm.

Preferably, the mounted samples are successively fed to the grinder and/or polisher in an automated manner so that they can be successively gripped by the sample gripper. For this purpose, the grinder and/or polisher preferably comprises an automated sample feed, via which the individually mounted samples successively enter the sample removal position in an automated manner. When the sample gripper grips and removes the mounted sample currently in the sample removal position, the next mounted sample is automatically advanced to the sample removal position and is ready for the sample gripper when the grinding and/or polishing process of the previous mounted sample is completed.

This contributes to the efficiency of the overall process.

The automated feeding device can, for example, comprise a chute in which the mounted samples automatically slide successively in the direction of the sample removal position due to gravity, or a conveyor belt which automatically feeds the mounted samples successively to the sample removal position, with a sample stop possibly defining the sample removal position, or a sample magazine in which, for example, a plurality of mounted samples is inserted in a stacked manner. A separator that separates the mounted samples can be provided upstream from the sample removal position, and/or the lower part of the chute can be pivoted horizontally to remove the sample, so that the sample gripper can pick up the sample horizontally. The separator separates the samples from each other to a certain extent and/or prevents further samples from slipping in during the swiveling and/or gripping motion of the sample currently to be gripped. The bottom sample can be pushed into the sample removal position by means of a sample pusher as well.

According to a particularly preferred embodiment, the grinder and/or polisher comprises a plurality of surface-processing stations arranged next to one another for processing the underside of the sample, each of the surface-processing stations having its own rotating and/or vibrating grinding plate with a grinding disc for grinding the underside of the sample or its own rotating and/or vibrating polishing plate for polishing the underside of the sample. Accordingly, in a manner, the grinding-/polishing head with the gripped mounted sample successively moves to at least two, preferably more than two, depending on the desired surface, 2 to 10, preferably 3 to 8, preferably 3 to 6 surface-processing stations to automatically grind and polish the same mounted sample in succession, and/or to grind the sample with different grits in succession and/or to polish the sample with different polishing agents in succession. Preferably, the mounted sample does not need to be reclamped, but is processed with all surface-processing steps in one and the same grinder and/or polisher, or remains on the same grinding/polishing head or sample gripper during all surface-processing steps, and no grinding or polishing discs need to be changed (except due to wear).

This can have benefits in terms of size, efficiency of the workflow and/or the quality of the result obtained.

Preferably, therefore, the grinder and/or polisher comprises at least a first grinding station with a first grinding disc and a first polishing station with a first polishing disc. The grinding-/polishing head preferably moves with the mounted sample gripped by the sample gripper first to the first grinding station and then, in particular without reclamping the mounted sample and preferably with the interposition of a cleaning station, to the first polishing station in order to first grind and then polish the same mounted sample automatically in the same grinder and/or polisher in a program-controlled manner.

Preferably, the grinder and/or polisher comprises at least two, preferably even more than two grinding stations, each with a grinding disc, e.g. a first grinding station with a first grinding disc, a second grinding station with a second grinding disc, a third grinding station with a third grinding disc, and possibly further grinding stations, each with further grinding discs, and/or comprises at least two or more polishing stations, each with a polishing disc, e.g. a first polishing station with a first polishing disc and a second polishing station with a second polishing disc. Preferably, the grinding-/polishing head with the gripped mounted sample thus moves, without performing a reclamping step, to at least two, three or more grinding stations and/or at least one polishing station, at least two or more polishing stations in succession, in order to automatically grind and/or subsequently polish the same mounted sample in the same grinder and/or polisher in succession in a program-controlled manner with different grit sizes, if necessary, in succession with different polishing agents.

According to a preferred embodiment, the grinder and/or polisher comprises at least one cleaning container or cleaning bath, which the grinding-/polishing head moves to in a program-controlled manner and into which the gripped mounted sample is immersed before, between and/or after the grinding and/or polishing processes. Preferably, the at least one cleaning container comprises an inlet and/or outlet for liquid in order to be able to automatically fill and/or empty the cleaning container in a program-controlled manner.

Preferably, the grinder and/or polisher comprises at least one gas nozzle, in particular on the cleaning container, for automatically blow-drying the gripped mounted sample in a program-controlled manner before, between and/or after the grinding and/or polishing processes. Accordingly, the gripper can first grind the mounted sample in a grinding station, then immerse said sample in the cleaning bath to rinse off any grinding debris, then blow-drying in the cleaning bath above the cleaning liquid level, and then polish it, all in a program-controlled manner using the same grinding-/polishing head or the same sample gripper, in particular without having to reclamp the mounted sample.

Preferably, the grinder and/or polisher comprises one or more liquid nozzles for supplying cooling liquid and/or rinsing liquid, e.g. water, in order to supply cooling liquid and/or rinsing liquid during the grinding process at a grinding station. A polishing suspension, e.g. a diamond particle suspension can also be supplied via one of the liquid nozzles at a polishing station.

The liquid nozzles for the cooling liquid, rinsing liquid and/or polishing suspension are preferably arranged on the grinding-/polishing head for this purpose, in order to travel with the grinding/polishing head and thus with the mounted sample from one surface-processing station to the next surface-processing station, among other things so that a plurality of surface-processing stations can be operated with the same liquid nozzle or nozzles. This way, the grinder and/or polisher only needs to have one set of liquid nozzles per grinding/polishing head, regardless of the number of surface-processing stations. Preferably, at least two liquid nozzles are arranged on the grinding/polishing head, namely at least one liquid nozzle for cooling and rinsing liquid for the grinding process and at least one liquid nozzle for the polishing suspension for the polishing process, so that at the grinding stations cooling and/or rinsing liquid and at the polishing stations polishing suspension can be automatically fed in with the one liquid nozzle in a program-controlled manner. However, more than two liquid nozzles can also be provided, e.g. for a plurality of different cooling and rinsing liquids, in particular for different polishing suspensions.

According to one possible embodiment, the surface-processing stations and, if necessary, the at least one cleaning container are arranged along a linear arrangement in the grinder and/or polisher. The grinding-/polishing head is preferably suspended along this linear arrangement in a linearly displaceable manner by means of a linear guide in order to be able to move to the various surface-processing stations one after the other by moving the grinding-/polishing head along the linear guide over the surface-processing stations and, if necessary, over the cleaning container, and stopping automatically at the respective station in a program-controlled manner and lowering the mounted sample with the gripper, for example for grinding purposes, onto the grinding disc in the grinding station, for cleaning purposes, into the cleaning bath and/or for polishing purposes, onto the polishing disc in the polishing station. Such a linear arrangement can be desirable in the laboratory in terms of the space requirements.

To further make good use of the space available in a laboratory, the surface-processing stations and the optionally at least one cleaning container can also be arranged in a two-dimensional arrangement in the horizontal plane. For example, 2 grinding stations and 2 polishing stations can be arranged in a 2×2 arrangement, 3 grinding stations and 2 polishing stations can be arranged in a 3×2 arrangement, or even more surface-processing stations. Preferably, the cleaning container(s) is/are still arranged between the grinding and/or polishing stations, possibly in a laterally offset manner. Such arrangements can be beneficial for the process speed with regard to the paths when moving to the surface-processing stations and the cleaning container(s), if any. In a two-dimensional arrangement, the grinding-/polishing head is also suspended independently in two dimensions, e.g. independently in the x-direction and in the y-direction, in order to be able to move to all points in the horizontal plane. This can be achieved, for example, by means of a gantry arrangement, similar to a container crane, in order to be able to move to all surface-processing stations and the cleaning container(s) in the two dimensions of the x-direction and the y-direction. For this purpose, the grinding/polishing head can be suspended from a bridge, e.g. U-shaped, and the grinding/polishing head is suspended from the bridge so as to be movable in a linear direction x or y. The bridge itself, in turn, stands on linear guides which allow the bridge to be displaced in the other linear direction y or x, respectively.

Preferably, the housing of the grinder and/or polisher comprises a safety enclosure, for example in the form of a protective grille, in which all moving parts, such as the gripper, the grinding/polishing head and/or all grinding and/or polishing stations are housed in order to avoid the risk of injury. The safety enclosure may be open at the front, with the front opening being secured against any interference by a light barrier, e.g. a (laser-) light grid, in that the light barrier automatically initiates an emergency shutdown if the operator reaches through the light barrier into the interior of the safety enclosure, for example to access the sample gripper, a grinding station, a polishing station or a cleaning container.

The sample gripper is suspended from the grinding/polishing head so that it can be moved vertically and linearly, in particular by means of a vertical linear guide. In order to move the sample gripper vertically, the grinding-/polishing head thus preferably comprises a vertical linear slide on which the sample gripper and/or the motor for the rotational drive of the sample gripper is suspended so that it can be moved longitudinally in the z-direction (perpendicular to the table plane). The vertical linear slide can, for example, comprise a spindle drive for the vertical movement of the sample gripper. This can allow for the vertical displaceability and simultaneous continuous rotation of the sample gripper, so that the sample gripper can automatically, in a program-controlled manner, i) move with the grinding/polishing head to the sample removal position(s), the grinding station(s), the polishing station(s), the cleaning container(s) and/or the sample deposit position(s), ii) be lowered there for receiving and gripping the mounted sample, for the purposes of grinding, polishing, rinsing and/or depositing the mounted sample, and iii) rotate for example during the grinding, polishing, rinsing and/or depositing the mounted sample and iv) be subsequently moved up again before the next process step. Preferably, each mounted sample is individually and successively, one after the other, guided through the grinding process by the sample gripper in an automated manner from the time it is supplied to the grinder and/or polisher until it is completely ground, polished and cleaned by means of the grinding process, if necessary with a plurality of grinding steps, the polishing process, if necessary with a plurality of polishing steps, and possibly by means of the cleaning process, if necessary with a plurality of cleaning steps, and in particular in one and the same device. In spite of that, the grinder and/or polisher can be built as a relatively compact device, possibly even as a tabletop device. The mounted sample which has thus been completely ground, polished and cleaned, can then be subjected directly, for example, to a hardness test, for example with a hardness testing device, e.g. a hardness tester of the Applicant's Q series, or a microstructure analysis can be carried out.

Preferably, the mounted samples are present loosely at the sample removal position as individual mounted samples and do not need to be manually clamped in special sample holders, in particular for a plurality of mounted samples. Furthermore, if the same grinding and/or polishing head with the same sample gripper can move to a plurality of grinding stations and/or a plurality of polishing stations, if necessary with different abrasives and/or polishing agents, in an automated and program-controlled manner without the mounted sample having to be reclamped.

For grinding and/or polishing the mounted sample, if the grinding-/polishing head comprises a force sensor which measures the contact force of the sample gripper with the mounted sample against the grinding disc or polishing disc, as well as a control circuit which adjusts the contact force of the mounted sample to a predetermined value by means of the drive, preferably spindle drive, of the vertical linear slide.

Preferably, the path covered by the sample gripper in the vertical direction (z-direction) is measured as well. For this purpose, the grinding-/polishing head preferably comprises a displacement meter by means of which the linear travel distance of the sample gripper or its vertical linear slide in the z-direction is measured. This way, a layer thickness set by the operator can, for example, be automatically removed during the grinding process in a program-controlled manner. For this purpose, the vertical linear slide moves the mounted sample to the grinding disc until contact with the grinding disc is detected by means of the force sensor and stored as the zero position for the displacement path. The grinding of the mounted sample is then automatically program-controlled until the value previously set by the operator in the program control device for the grinding thickness is reached. The zero point for grinding off a predetermined layer thickness can therefore be determined by means of the force sensor.

The disclosure is also a method for automatically grinding and/or polishing the underside of, in particular, mounted samples automatically controlled by a program control, in particular with the grinder and/or polisher described above, wherein the program control device automatically controls the grinding-/polishing head with a sample gripper movable thereon in the z-direction with at least the following steps, in particular without reclamping the sample:

a) moving to a sample removal position with the grinding-/polishing head and lowering the sample gripper and gripping an individual, in particular loosely mounted sample with the sample gripper in the sample removal position, b) moving to a grinding station, lowering the sample gripper with the sample and pressing the sample with a predefined pressure force onto a rotating grinding disc of the grinding station, in particular with the sample gripper performing a rotating movement, if necessary with cooling liquid being added, and lifting the sample gripper with the sample, c) if necessary, moving to and immersing the sample gripped by the sample gripper in a cleaning container (sample bath) and lifting the sample out of the cleaning container and, if necessary, blow-drying the sample, d) if necessary, repeating step b), but at a different grinding station, in particular with a different grinding disc than in step b), e) if necessary, repetition of step c), with the step sequence d) and/or e) being repeated further times if necessary, in particular at other grinding stations with other grinding discs, f) moving to a polishing station, as well as lowering of the sample gripper with the sample and pressing the sample with a predefined pressure force onto a polishing disc of the polishing station, if necessary with the sample gripper engaging in a rotation movement, if necessary with a polishing suspension being added, as well as lifting of the sample gripper with the sample, g) if necessary, moving to a cleaning container and immersing the sample gripped by the sample gripper in the cleaning container (sample bath) and lifting the sample out of the cleaning container and, if necessary, blow-drying the sample, h) if necessary, repeating step f), but at a different polishing station, if necessary with a different polishing agent, e.g. with the addition of a different polishing suspension than in step f), i) if necessary, repeating step g), with the step sequence h) and/or i) being repeated further times if necessary, in particular at other grinding stations with other polishing agents, e.g. other polishing suspensions, h) moving to a sample deposit position with the grinding-/polishing head, and depositing the sample with the sample gripper at the sample deposit position, in particular by lowering the sample gripper and releasing the sample with the sample gripper.

The disclosure is to provide a grinder/polisher and/or etcher for processing the underside of a mounted sample, particularly as described above, comprising:

a device housing, a sample gripper for gripping a sample, the sample gripper being adapted to grip an individual mounted sample, and at least one or more of the following stations or combinations thereof:

a grinding station comprising a grinding plate and a grinding disc for abrasive processing in the form of grinding the underside of the mounted sample, a cleaning station for cleaning the underside of the mounted sample, a polishing station with a polishing plate for abrasive processing in the form of polishing the underside of the mounted sample, and/or an etching station for etching the underside of the mounted sample, wherein the mounted sample is gripped by the sample gripper and the sample gripper moves the gripped mounted sample to one or more of the stations to process the underside of the mounted sample in the respective station or to clean the mounted sample.

The gripping of individual mounted samples has proven to be desirable in terms of an automated workflow. Furthermore, any manual clamping in a sample holder and, if necessary, any dressing is no longer necessary. Furthermore, the device can be built with relatively small dimensions and be cost effective.

Automated Production Line

The disclosure further relates to an automated production line which can perform both the mounting of metallographic samples and the subsequent surface-processing of the mounted samples automatically in a program-controlled manner, in particular without any operator intervention, and which the samples automatically undergo from the mounting to their completion with a processed, i.e. ground and possibly polished, sample underside.

The production line comprises an automated mounting press for a program-controlled mounting and ejection of a plurality of samples consecutively one after the other and an automated surface-processing device for a program-controlled processing of the underside of the plurality of samples mounted by the mounting press consecutively one after the other, in particular as described above. The surface-processing device further comprises a sample removal position for the mounted samples delivered from the mounting press and a sample deposit position for depositing the surface-processed mounted samples. The processing of the underside of the sample is performed as abrasive processing, in particular grinding and/or polishing. Accordingly, the surface-processing device is in particular a grinder and/or polisher with which the underside of the sample can be ground and/or polished.

At the end of the production line, i.e. after the surface-processing device, there may be a sample collection device for collecting the plurality of mounted samples mounted by the mounting press and ground and/or polished by the grinder and/or polisher, for removal and further use by the operator.

The samples mounted and ejected by the mounting press are automatically consecutively conveyed to the sample removal position of the grinder and/or polisher by a first conveying device. The mounted samples ground and/or polished by the grinder and/or polisher can, if necessary, be conveyed from the sample deposit position to the sample collection device by means of a second conveying device. Accordingly, the mounted samples are automatically fed to the grinder and/or polisher and/or automatically conveyed away from it again.

The mounting press and the grinder and/or polisher are automatically controlled by program control devices, so that the mounting press and the grinder and/or polisher can both consecutively mount and grind and/or polish a plurality of samples in a program-controlled manner.

A large number of samples can be mounted, ground and, if necessary, polished automatically with the production line in a single pass in a program-controlled manner without any operator intervention, which represents an enormous increase in efficiency compared to conventional equipment.

Preferably, the samples are not only mounted individually, but the mounted samples are further processed individually throughout the production line and in particular without any sample holders. In particular, the first and/or second conveying device convey the mounted samples individually and loosely. Furthermore, the mounted samples are ground and/or polished individually in the grinder and/or polisher and/or are deposited individually in the sample deposit position after the grinding and/or polishing process and/or the mounted ground and, if necessary, polished samples are automatically deposited individually and loosely in the sample collection device, e.g. a magazine with a plurality of deposit positions for one mounted ground and, if necessary, polished sample after the sample has passed through the production line and is ready to be removed by the operator. The mounted samples that are ready in the sample collection device can be used directly from there, e.g. in an analysis device such as a hardness tester, a microscope, a macroscope or a similar analysis device, or used for microstructure analyses or other metallurgical analyses, in particular without any further surface-processing steps on the actual material sample.

This saves the operator from having to clamp and unclamp a plurality of samples, e.g. 6 samples, in a sample holder, which is necessary in many conventional devices, and simplifies the combined mounting and surface finishing process and helps to increase the efficiency of the manufacturing process for mounted ground and possibly polished samples.

To convey the individual, loosely mounted samples from the mounting press to the grinder and/or polisher and/or from the latter to the collection station, chutes or motor-driven conveyor belts can be used, for example. Since, downstream from the mounting press, the mounted samples continue to move individually through the production line, the conveyor belts, as well as the grinder and/or polisher, can have a relatively compact design. The conveyor belts only require a clear conveying width corresponding to the diameter of an individual mounted sample, which can be in the range of 15 mm to 100 mm, preferably in the range of 25 mm to 50 mm.

In particular, the entire production line, including the automated mounting press and the grinder and/or polisher, can be so compactly constructed that it can be placed on a laboratory floor unit. The footprint of the production line is preferably no larger than 800 cm×150 cm, preferably no larger than 600 cm×120 cm, preferably no larger than 400 cm×90 cm.

The automated mounting press preferably comprises a pressing unit with the press cylinder, a feeding device for feeding mounting material, e.g. plastic granules, and a sample loading table with a plurality of loading stations, on each of which the operator can place a sample to be mounted. In a preparatory step, the operator can load a plurality of the loading stations each with a sample to be mounted, e.g. several tens of samples to be mounted. After this typically only manual preparatory step, the operator can start the production line by means of the program control device and the production line then automatically mounts one sample after the other, automatically conveys one mounted sample after the other to the grinder and/or polisher and the grinder and/or polisher automatically grinds and, if necessary, successively polishes one sample after the other the underside of the mounted samples and conveys the thus mounted and ground and/or polished samples to the sample collection device, preferably as individual loosely mounted samples without the need for a sample holder, as has already been explained above.

For mounting the samples, the press cylinder preferably has a lower first opening and an upper second opening. The sample to be mounted is preferably introduced into the press cylinder from the respective mounting location through the lower first opening and the mounting material is fed into the press cylinder through the upper second opening.

The spatial separation of the introduction of the sample to be mounted and the mounting granulate into the press cylinder is from a design standpoint and can contribute to a further increase in efficiency in the automated program-controlled mounting of the samples with the press cylinder.

After the process in the mounting press, the mounted sample is preferably moved upward through the upper second opening out of the press cylinder and the pressing unit comprises a sample ejector, which ejects the mounted sample from the pressing unit onto the first conveying device in a program-controlled manner.

The automated sample ejector contributes to the degree of automation of the production line and the spatial separation of the sample introduction into the press cylinder and the sample ejection of the mounted sample from the press cylinder may be desirable for the automated production line from a design standpoint.

After the process in the mounting press, the press plunger preferably moves upward in the press cylinder and thereby moves the mounted sample upward out of the press cylinder. Then the sample ejector, which is designed e.g. as a motor-driven pusher, can push the mounted sample down from the press plunger onto the first conveying device transversely to the axis of the press cylinder, i.e. essentially horizontally. The motor-driven pusher can comprise, for example, an electric motor, a pneumatic or a hydraulic drive.

The surface adhesion between the mounting material and the press cylinder can be overcome and the paths of the mounted samples can be kept short, which can contribute to the compactness and design simplicity of the production line.

The surface-processing device, which is preferably a grinder and polisher for plane grinding and polishing the underside of the mounted samples, preferably comprises the following:

A grinding station with a grinding plate and a grinding disc for grinding the underside of the sample, and a polishing station with a polishing plate for polishing the underside of the sample. Preferably, the surface-processing device is a combined grinder and polisher with corresponding grinding and polishing stations. Preferably, a plurality of grinding stations and, if necessary, polishing stations are provided in one and the same device, so that all required grinding operations can be carried out with different grit sizes and all required polishing operations, if necessary, with different polishing suspensions in one and the same device. Each grinding station preferably has its own grinding tray, its own grinding plate and its own grinding disc applied to the associated grinding plate, and each polishing station preferably has its own polishing tray and its own polishing plate, optionally with a polishing disc, which may also comprise a polishing cloth.

Preferably, a sample gripper picks up the mounted samples from the sample removal position in that the sample gripper grips an individual loosely mounted sample and then moves it from station to station to perform the respective surface-processing steps on the underside of the sample. In other words, the sample gripper picks up an individual sample and then moves it first to one of the grinding stations to perform a first grinding operation. Subsequently, the sample gripper can move the same mounted sample to the next grinding station, for example, to perform a grinding operation with a finer grit. Then, the sample gripper can move the same sample to a polishing station to perform a polishing operation, and so on. Preferably, about 4 to 6 grinding and polishing operations with different grinding and polishing media are performed on each sample, each grinding and polishing operation being performed at a separate station. Replacing the grinding discs and/or polishing discs between the grinding and/or polishing operations, i.e. during the running process, can be avoided, except when the grinding discs have to be replaced due to wear. This renders the grinding and polishing process highly efficient.

If necessary, the grinder and/or polisher may comprise further cleaning containers and the sample gripper moves the mounted samples to a cleaning station after each grinding and polishing operation to rinse and clean the mounted sample.

After all desired grinding and polishing processes and, if necessary, cleaning processes have been performed, the grinding-/polishing head moves the sample with the sample gripper to the sample deposit position and the sample gripper deposits the sample there.

As already explained, the mounted samples are processed individually and preferably loosely in the grinder and/or polisher as well, i.e. the sample gripper is adapted to grip a mounted sample individually without a sample holder, and to move the individual sample gripped in this manner from grinding station to grinding station, from grinding station to polishing station and from polishing station to polishing station, if necessary with the interposition of the cleaning stations, through all grinding and polishing processes and, if necessary, cleaning processes.

On the one hand, this avoids the need for clamping samples in and unclamping samples from a sample holder. On the other hand, the handling of individual samples and the elimination of a plurality of sample holders during the intermediate storage of the mounted samples between the mounting press and the grinder and polisher and during the final storage in the sample collection device as well as during the transport on the conveyor belts contribute to space savings. In addition, the grinding stations, the polishing stations and/or the cleaning stations can also be designed with a small overall size, which additionally contributes to the compactness and cost savings of the production line in a synergistic manner. Previous antipodes in the production of mounted samples, namely a high degree of automation and high efficiency on the one hand and low space requirements and low costs on the other, can be leveraged.

Preferably, the grinding-/polishing head comprises a drive shaft which is rotated by a motor. The sample gripper is arranged on the drive shaft so that the sample gripper rotates about an axis of rotation. A high-quality grinding or polishing result can be achieved, if the sample rotates during the grinding and polishing processes in addition to the rotation of the grinding disc or the rotation or vibration of the polishing disc. Preferably, the axis of symmetry of the mounted sample runs coaxially with the axis of rotation of the sample gripper when the mounted sample is gripped by the sample gripper, so that the mounted sample rotates about its axis of symmetry.

In the context of the automated production line, if the same grinder and/or polisher comprises at least two or more grinding stations, e.g. 2, 3, 4, 5, 6, 7, 8 or more grinding stations each with its own grinding plate and grinding disc. This way, different grinding discs with different grit sizes can be kept available at the different grinding stations, so that no grinding discs have to be changed for grinding the underside of the sample with different grit sizes, e.g. with 2, 3, 4, 5, 6, 7, 8 or more different grit sizes, in particular with all grit sizes with which the mounted samples are ground. All grinding discs with different types of grit necessary for grinding a production run of mounted samples, e.g. several tens of samples, are mounted in the different grinding stations at the same time, so that the grinding discs do not have to be changed between the grinding processes of the mounted samples, but the samples are moved one after the other from grinding station to grinding station without changing the grinding discs in-between. In other words, one and the same grinder and/or polisher comprises at least so many grinding stations that there is a separate grinding station for each grit size and all these grinding stations belong to the same grinder and/or polisher or can be accessed by the same sample gripper.

The same may apply to the polishing stations, of which at least one, but preferably at least two or more, e.g. 2, 3, 4 or more polishing stations are present in the grinder/polisher. Thus, each polishing station may be associated with a particular polishing medium, e.g. a particular polishing suspension. This may avoid the need to replace the polishing discs or completely clean the polishing stations between samples. Again, preferably all polishing means necessary for grinding a production run of mounted samples, e.g. a few tens of samples, are present simultaneously in different polishing stations, so that the polishing discs and/or polishing suspensions do not have to be changed during the polishing of the plurality of mounted samples, but the samples are moved one after the other from polishing station to polishing station without having to change the polishing discs and/or polishing suspensions in-between. In other words, one and the same grinder and polisher comprises at least so many polishing stations that there is a separate polishing station for each polishing disc or each polishing suspension and all these polishing stations belong to the same grinder and polisher or can be accessed by the same sample gripper.

This means in particular that all grinding stations with the grinding discs required for a mounted sample and all polishing cloths and/or polishing suspensions required for the same sample are part of same grinder and polisher or can be accessed by the same sample gripper. Accordingly, each mounted sample is gripped once by the sample gripper, and then all required grinding stations (e.g. 2, 3, 4, 5, 6, 7, 8 or more) and/or all required polishing stations (e.g. 1, 2, 3, 4 or more) are accessed by one and the same sample gripper in order to carry out the respective grinding and/or polishing processes with different grit sizes and, if necessary, different polishing cloths and/or polishing suspensions, with the mounted sample remaining gripped by the sample gripper during all grinding and/or polishing processes.

The grinder and/or polisher may further comprise at least one cleaning container, preferably two or more cleaning containers, which are accessed by the grinding-/polishing head or the sample gripper and into which the respective gripped mounted sample is immersed before, between and/or after the grinding and polishing processes in order to clean said sample.

One aspect of the disclosure relates to an automated method for producing a plurality of mounted samples with a ground and/or polished underside of a sample, in particular using the production line described above, comprising the following steps, optionally with the interposition of further steps:
- a) Providing a plurality of samples to be mounted at a mounting press in a preparatory step, if necessary by the operator manually placing the samples on a respective loading station of a sample loading table,
- b) Pressing the first of the samples to be mounted with mounting material in a press cylinder of the mounting press to produce the first mounted sample,
- c) Ejecting the first mounted sample from the press cylinder,
- d) Conveying the first mounted sample from the mounting press to a surface preparation device,
- e) Gripping the first mounted sample with a sample gripper of the surface-processing device, one at a time,
- f) Moving to at least one, preferably a plurality of consecutive surface-processing stations, e.g. one or more grinding stations and/or one or more polishing stations of the same surface-processing device, with the same sample gripper for a preferably consecutive multiple processing of the underside of the first mounted sample in the different surface-processing station(s) with different grinding and/or polishing means,
- g) Moving to a sample deposit position with the sample gripper and depositing the first mounted sample at the sample deposit position,
- h) Repeating steps b) to d) and e) to g) a number of times to automatically produce a plurality of mounted samples with a surface-finished underside, all the finished mounted samples with a surface-finished underside being automatically fed individually to a sample-collecting device in order to be ready there for removal by the operator. Steps b) to h) are carried out automatically in a program-controlled manner, i.e. automatically one after the other for all samples, in particular without the need for any operator intervention in between. The repeat cycles of steps b) to d) and e) to g) can be independent of each other or synchronized, and the mounted samples can be buffered between the mounting press and the surface-processing device. In particular, if the repeat cycles of steps b) to d) and e) to g) are independent of each other and the mounting should have a lead time of more than one mounted sample, the mounted samples are buffered between the mounting press and the surface-processing device.

Preferably, the sample gripper moves to a cleaning container after each grinding and/or polishing process, also in a program-controlled manner, and dips the mounted sample gripped by the sample gripper into the cleaning container in order to rinse or clean the mounted sample.

Below, the present disclosure will be explained in more detail by means of embodiments and with reference to the figures. In this regard, the same and similar elements are partially provided with the same reference signs and the features of the various embodiments can be combined with each other.

DETAILED DESCRIPTION OF THE EMBODIMENTS

1. Automated Mounting Press

Figure 1:
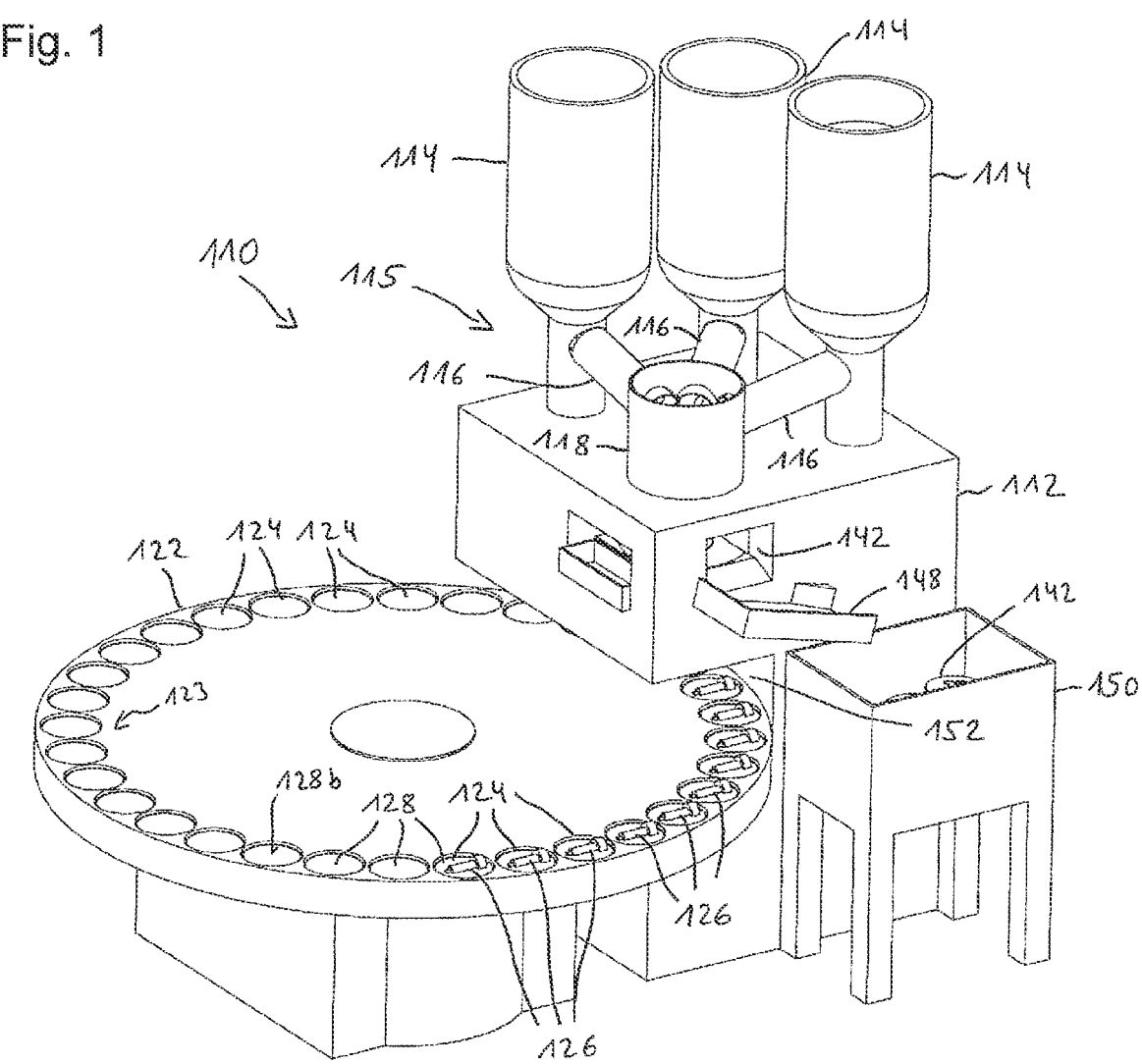
FIG. 1 is a three-dimensional representation of automated mounting press.

With reference to FIGS. 1 to 7, an example of an automated mounting press 110 is shown. The mounting press 110 comprises a housing 112 on which, in this example, three storage containers 114 for plastic granules as mounting material are present, with different mounting granules being held in each of the storage containers 114. By means of a feeding device 115, the desired quantity of the different mounting granules can be fed into the press cylinder in a program-controlled manner without any user intervention. For this purpose, the storage containers 114 are connected to a common feed hopper 118 via connecting tubes 116, so that the desired mounting granules can be selectively fed from the respective storage container 114 into the press cylinder via the feed hopper 118.

Figure 5:
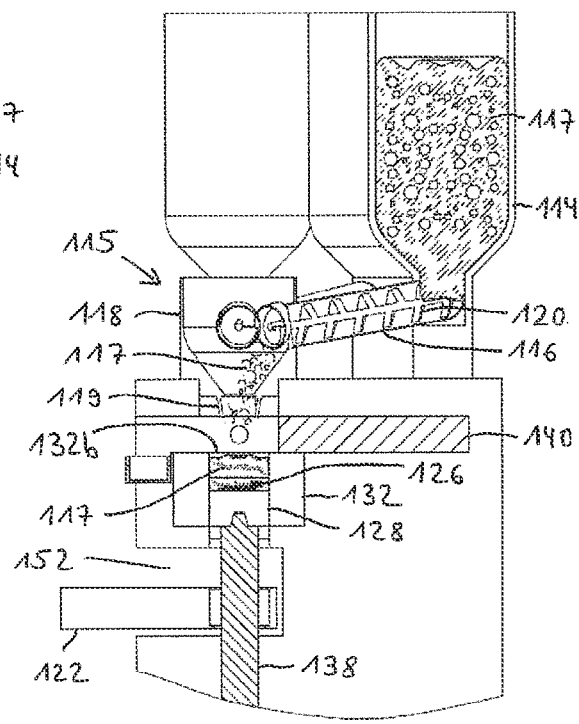

With reference to FIG. 5, the mounting granules 117 are conveyed by augers 120 in the connecting tubes 116 from the respective storage hopper 114 into the feed hopper 118, which comprises a rotary feeder 119 at the outlet.

Figure 3:
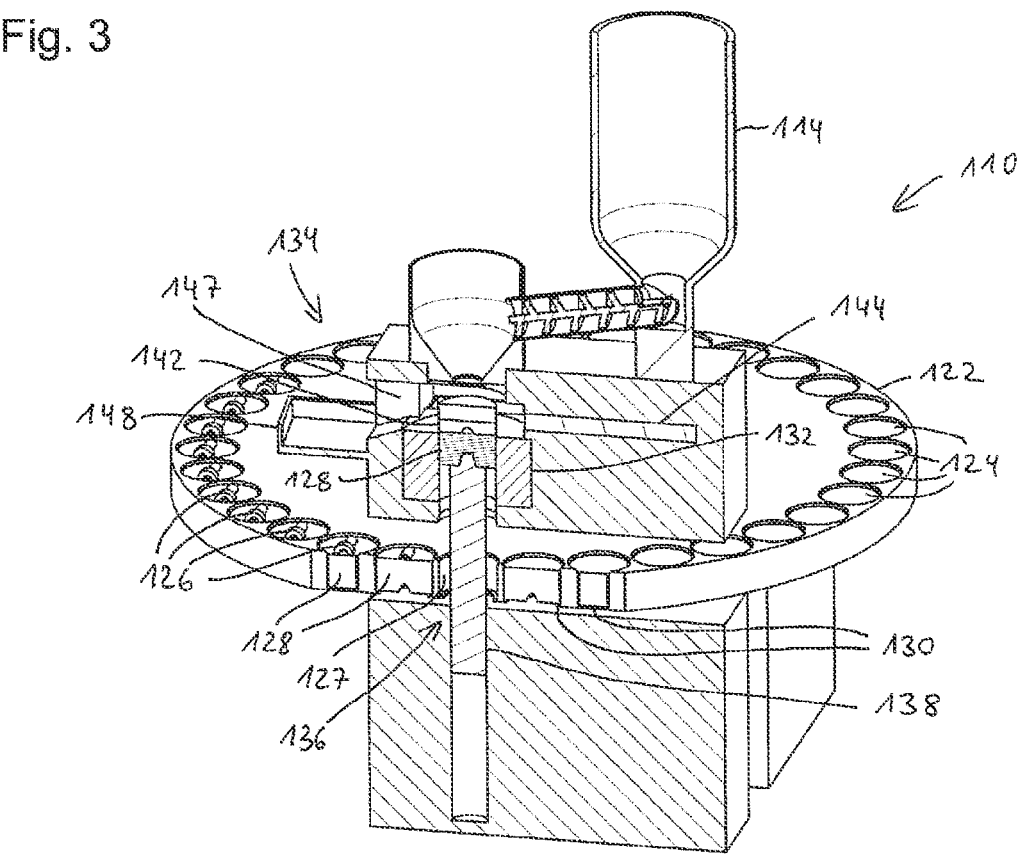
FIG. 3 is a three-dimensional partially cut-away representation of the mounting press of FIG. 1.

With reference to FIGS. 1 and 3, the mounting press 110 comprises a sample loading table 122 with a plurality of loading stations 124, in this example 32 loading stations 124. In this example, the sample loading table 122 is in the form of a rotary table and the loading stations 124 are arranged circumferentially in a peripheral annular region 123 of the sample loading table 112. Each loading station 124 comprises a cylindrical bore 127 in the sample placement table 122 and a plunger 128 in the form of a metal cylinder provided in the bore. The plunger 128 rests on the bottom of a rim 130 and is able to slide upwardly out of the bore. The plungers 128 are configured as press plungers for the heated press cylinder 132 of the pressing unit 134.

In a preparatory step, the operator places a metallographic sample 126 to be mounted, which is symbolized in FIG. 1 as a halved screw, on some or all of the loading stations 124 by placing the samples 126 to be mounted on top 128b of the respective plunger 128. For this purpose, the operator places each of the samples 126 to be mounted individually, piece by piece, on one of the loading stations 124. The plungers 128 in the loading stations 124 are somewhat recessed in the sample placement table 122, which facilitates the positioning of the samples 126 to be mounted when they are placed on the plunger 128.

After this manual preparatory step, the operator can start a program-controlled fully automated mounting process of all deposited samples 126 to be mounted. The control device or program control device 111 controls the mounting process of the samples 126 along clock cycles. With each clock cycle, the sample loading table 122 moves, in a program-controlled manner, one loading station 124 at a time with the plunger 128 lying therein and the sample 126 to be mounted deposited thereon into the sample receiving position 136 of the pressing unit 134, i.e. under the press cylinder 132.

FIGS. 4 to 7 schematically show the steps of a clock cycle during a hot-mounting pressing of one of the samples 126 to be mounted.

Figure 4:
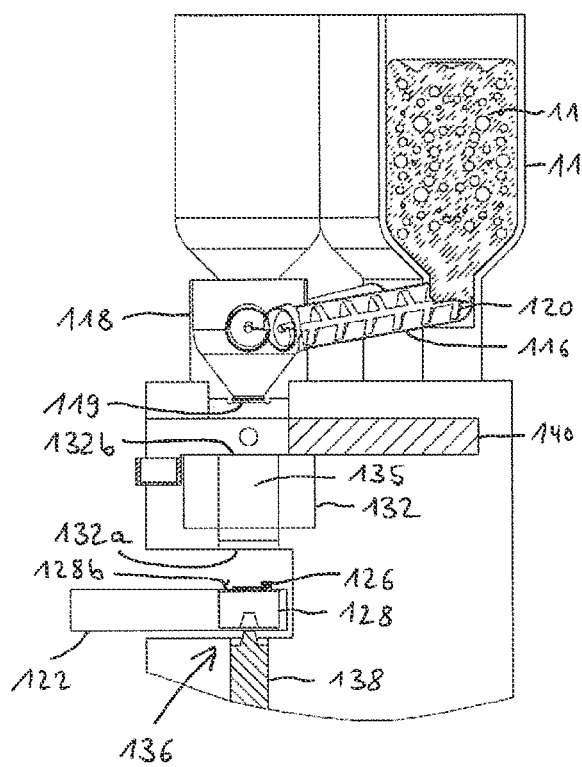
FIG. 4 is a schematic sectional representation of the mounting press from FIG. 1 in the starting state, FIG. 5 as in FIG. 4 during the feeding of the mounting granules, FIG. 6 as in FIG. 4 during the mounting process, FIG. 7 as in FIG. 4 during the ejection of the mounted sample.

In FIG. 4, the sample 126 to be mounted, which is intended for mounting and is deposited on its press plunger 128, is in the sample receiving position 136 below the press cylinder 132. A plunger drive 138, in the form of a plunger rod in the present example, moves upward, couples to the press plunger 128 from below, and pushes the press plunger 128 through a lower opening 132a of the press cylinder 132 into its cavity 135. The plunger rod 138 may, for example, be part of a hydraulic cylinder or be driven by a motorized spindle, which is not shown in detail in the figures.

With reference to FIG. 5, one or more, possibly different mounting granules 117 are now fed into the cavity 135 through an upper opening 132b of the press cylinder 132 onto the sample 126 and the press plunger 128 by means of the feeding device 115. Subsequently, the feeding opening 132b of the press cylinder 132 is closed with the closure slide 140 by sliding the closure slide 140 horizontally over the press cylinder 132.

Figure 6:
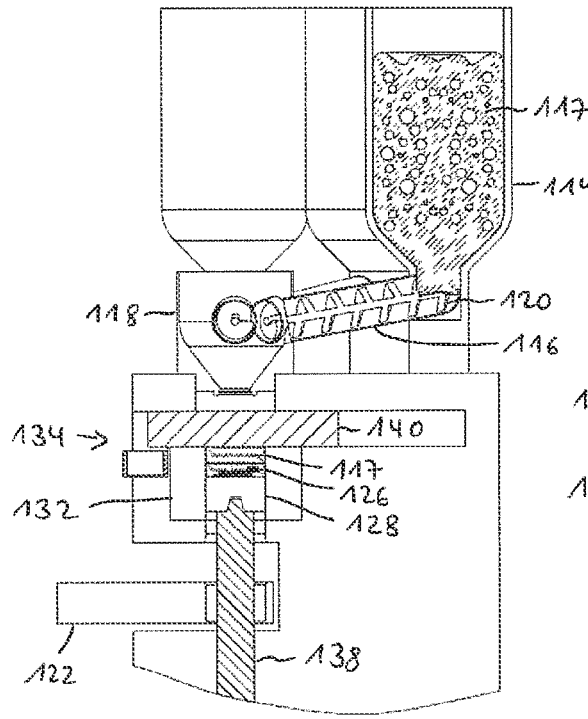

With reference to FIG. 6, the plunger rod 138 and the press plunger 128 are then used to hot-press the sample 126 between the press plunger 128 and the closure slide 140 with the mounting granulate 117 while heating the press cylinder 132 under high pressure. In the present example, two different mounting granules 117 were fed in, first a higher quality type of mounting granule, which subsequently surrounds the sample 126 on its underside and a lower cost mounting granule 117 in the upper region.

After the hot-mounting pressing process is completed, the closure slide 140 is pulled aside again to open the press cylinder 132 at the top. Subsequently, the plunger 128 is moved upwards by the plunger drive, with the now mounted sample 142 being moved out of the press cylinder 132 through the upper opening 132b.

Figure 7:
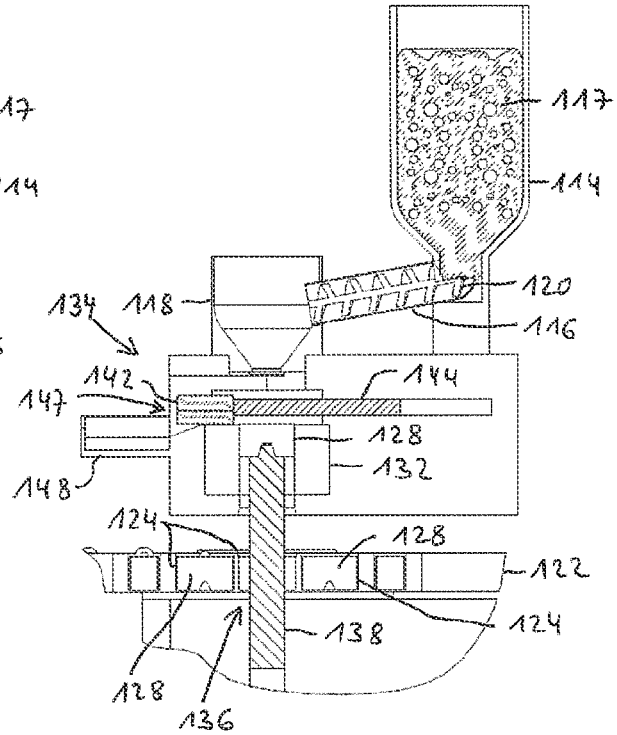

With reference to FIG. 7, the mounted sample 142 is now automatically pushed down horizontally from the plunger 128 to the side by the sample ejector 144, and in this example the mounted sample 142 is pushed out of a lateral ejection opening 147 from the pressing unit 134 and onto a sample chute 148, on which the mounted sample 142 slides into a collection container 150 (FIG. 1). In the example of the mounting press 110 shown in FIGS. 1 to 7, the mounted samples 142 are collected in the collection container 150.

Subsequently, the plunger rod 138 moves the press plunger 128 back down to deposit the press plunger 128 back in its loading station 124 and the plunger rod 138 decouples from the press plunger 128 again. For this purpose, the plunger rod 138 is locked in the respective press plunger 128 (not shown), so that press plunger 128 cannot disengage from the plunger rod 138 when it is pulled out of the press mold or press cylinder 132. The locking mechanism is such that it can be activated and released via the control device or the program control device 111. When the press plunger 128 is decoupled from the plunger rod 138 when it is deposited in the sample loading table 122, and the plunger rod 138 is moved down a little further so that the sample loading table 122 can move the next sample 126 to be mounted into the pressing unit 134 or under the press cylinder 132.

Now, the cycle for mounting the first sample is complete and the next cycle can begin in the same manner, with the sample placement table 122 moving the next loading station 124 into the sample receiving position 136 under the press cylinder 132.

In the example of the mounting press 110 shown, the sample loading table 122 is designed as a rotary table, which is rotated further by one position with each cycle by a drive device 151 clocked by the program control device 111, in order to then couple the plunger rod 138 to the next press plunger 128 with sample 126 to be mounted thereon.

The pressing unit 134 is generally U-shaped in the cross-section (FIGS. 2, 4 to 6) and comprises an insertion opening 152 under the heated and possibly cooled press cylinder 132. The loading stations 124 with the samples 126 to be mounted and the associated press plunger 128 are introduced laterally, cycle by cycle, into the insertion opening 152, which, in this example, is designed as a recess open at the side. In the present example, this is done by rotating the rotary table by an angular segment corresponding to the spacing of the loading stations 124. It is also conceivable, however, to use a linear sample mounting table 122 to advance the sample mounting table 122 by one position with each cycle so that the next press plunger 128 can be inserted into the press cylinder 132. The insertion opening 152 of the pressing unit 134 can also be secured against engagement, if desired (not shown).

Figure 8:
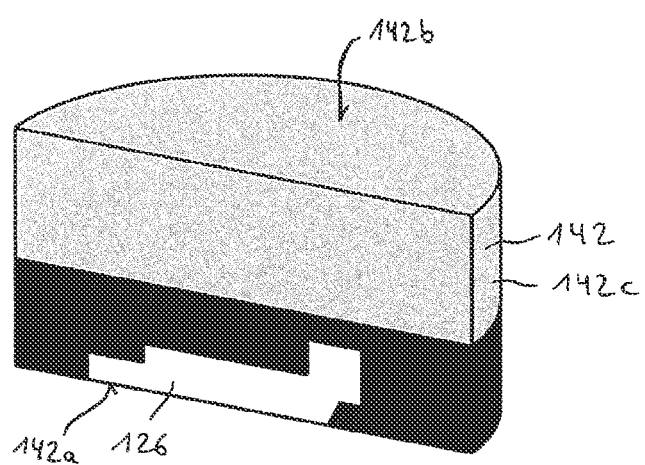
FIG. 8 is a cross section through an mounted sample.
Figure 2:
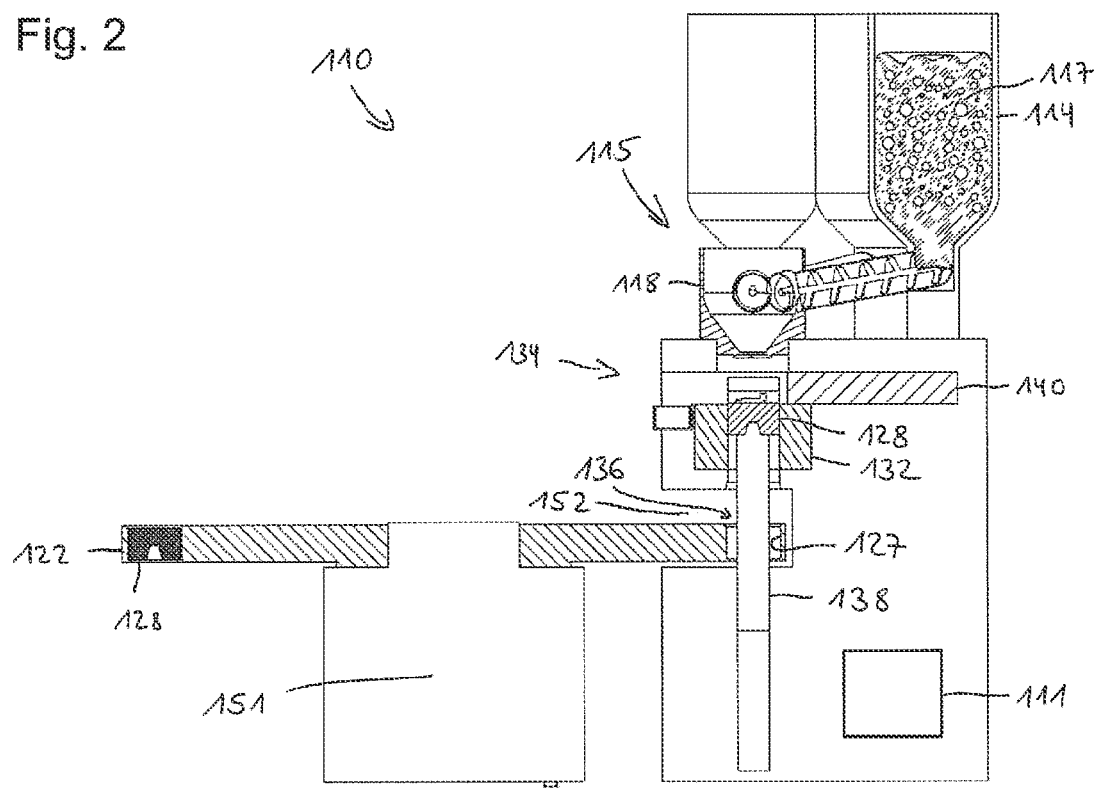
FIG. 2 is a cross section through a mounting press from FIG. 1.

Thus, apart from the preparatory manual loading step, the mounting press 110 represents a fully automated mounting press 110, in the sense that the pressing process and the ejection of the samples are carried out for a plurality of samples 126 to be mounted consecutively one after the other, piece by piece, and fully automated in a program-controlled manner. In other words, in the preparatory work step, the operator loads the loading stations 124 with all the samples 126 to be mounted, starts the mounting press 110, and, from this point on, the mounting press process runs fully automatically for all the samples 126 to be mounted, so that the operator can load and start the mounting press 110 in the evening, for example, and find all the samples in mounted form in the collection container 150 the next morning. FIG. 8 is a cross section through an example of a mounted sample 142.

Figure 29:
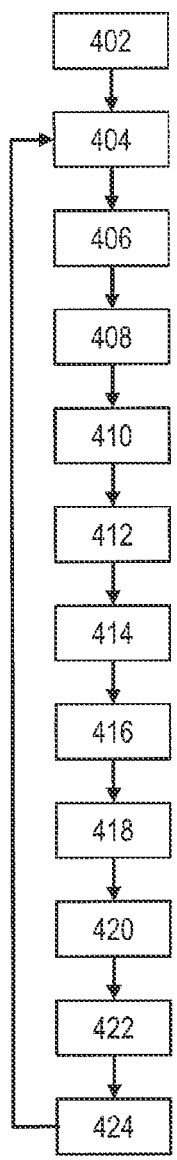
FIG. 29 is a process sequence for mounting samples with a mounting press according to FIG. 1 to FIG. 7.

With reference to FIG. 29, an embodiment of the pressing process comprises first, in a preparatory process step performed by an operator, namely the loading of a sample loading table with a plurality of samples to be mounted in a step 402 and subsequently the performance of clock cycles, each having the following program-controlled process steps:

Step 404: Moving the sample placement table 122, with one of the loading stations 124 with one of the press plungers 128 and the samples 126 to be mounted being placed thereon and moved to the sample receiving position 136 under the press cylinder 132 of the pressing unit 134.

Step 406: Moving the plunger drive 138 to the press plunger 128 and coupling the plunger drive 138 to the press plunger 128 in the loading station 124 at the sample receiving position 136.

Step 408: Inserting the press plunger 128 with the sample 126 to be mounted placed thereon by means of the plunger drive 138 from below into the cavity 135 of the press cylinder 132.

Step 410: Feeding one or more mounting granules 117 through a top opening 132b into the press cylinder 132 onto the press plunger 128 and the sample 126 to be mounted placed thereon.

Step 412: Closing the upper opening 132b of the press cylinder 132.

Step 414: Hot pressing the sample with the mounting granules 117 under pressure and temperature application in the press cylinder 132.

Step 416: Opening the press cylinder 132.

Step 418: Removing the mounted sample 142 from the press cylinder 132.

Step 420: Ejecting the mounted sample 142 from the press unit 134.

Step 422: Pulling the press plunger 128 out of the cavity 135 of the press cylinder 132 and depositing the press plunger 128 on a deposit location, in particular on the loading station 124 from step 406.

Step 424: Uncoupling the plunger drive 138 from the press plunger 128.

Program-controlled multiple repetition of the clock cycles with steps 404-424.

In summary, the mounting press 110 described above allows the mounting process to be fully automated for all samples 126 to be mounted without the presence of the operator after the preparatory mounting step. The design is nevertheless relatively simple and inexpensive, so that the investments for the automated mounting press 110 can be amortized in a short time.

2. Grinding and Polishing Machine

Figure 9:
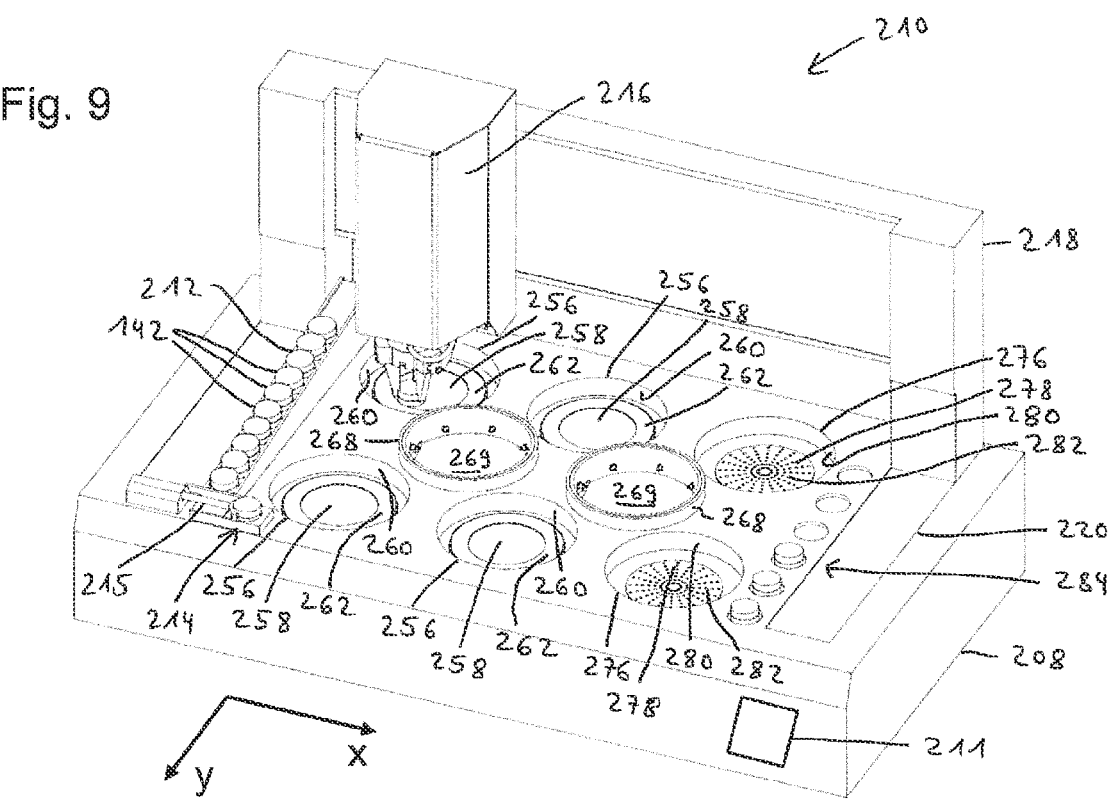
FIG. 9 is a three-dimensional representation of an automated grinder and polisher.
Figure 10:
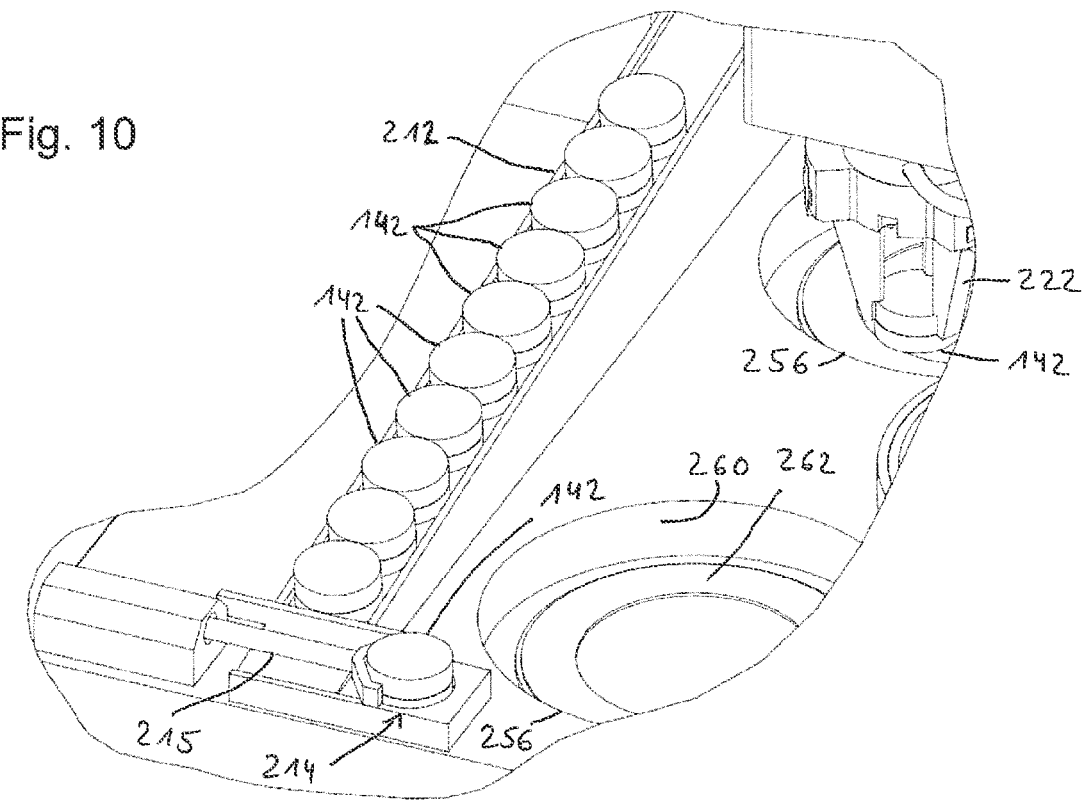
FIG. 10 is a sectional enlargement of the feed chute from FIG. 9, FIG. 11 as in FIG. 9, but with a feed belt.
Figure 11:
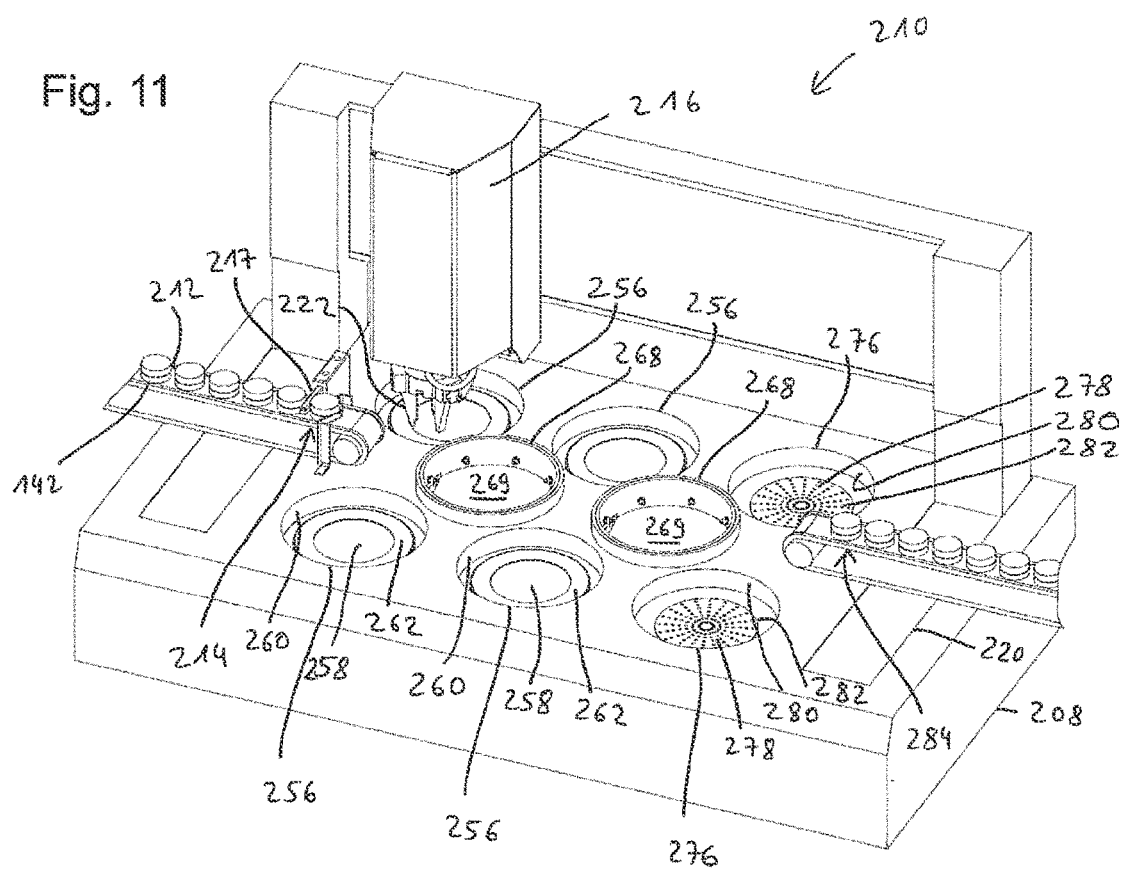
Figure 12:
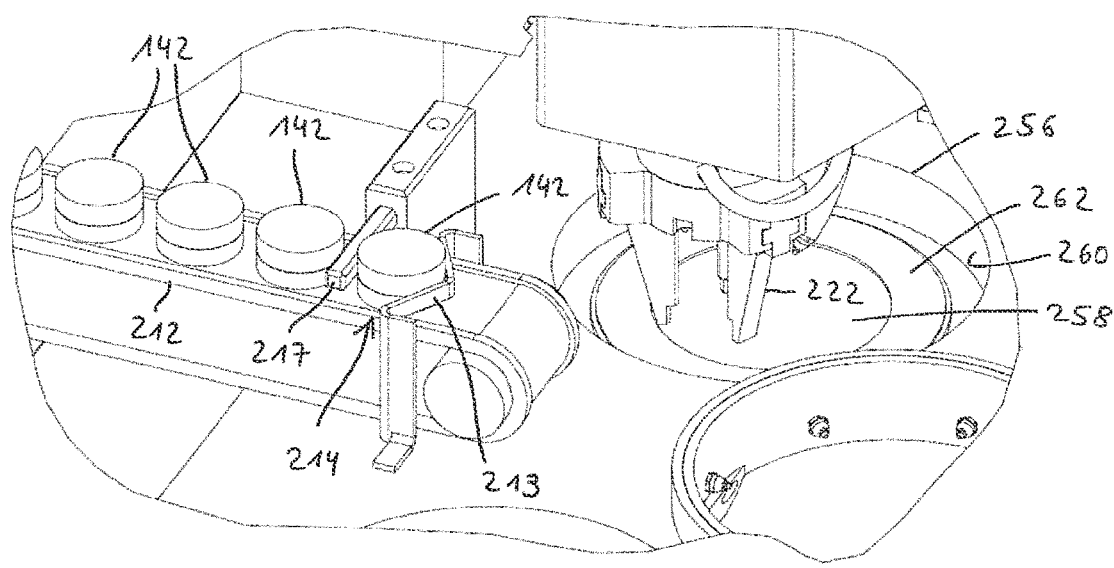
FIG. 12 is a sectional enlargement of the feed belt from FIG. 11, FIG. 13 as in FIG. 9, but with a vertical feed magazine.
Figure 13:
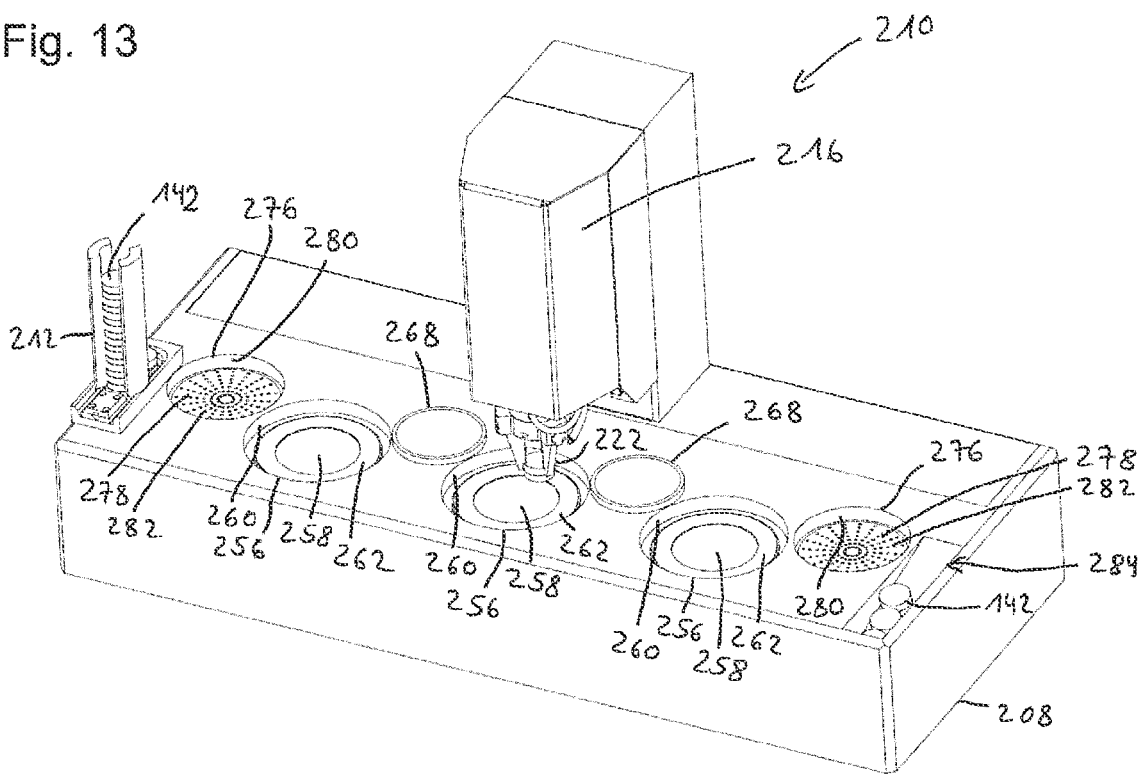
Figure 14:
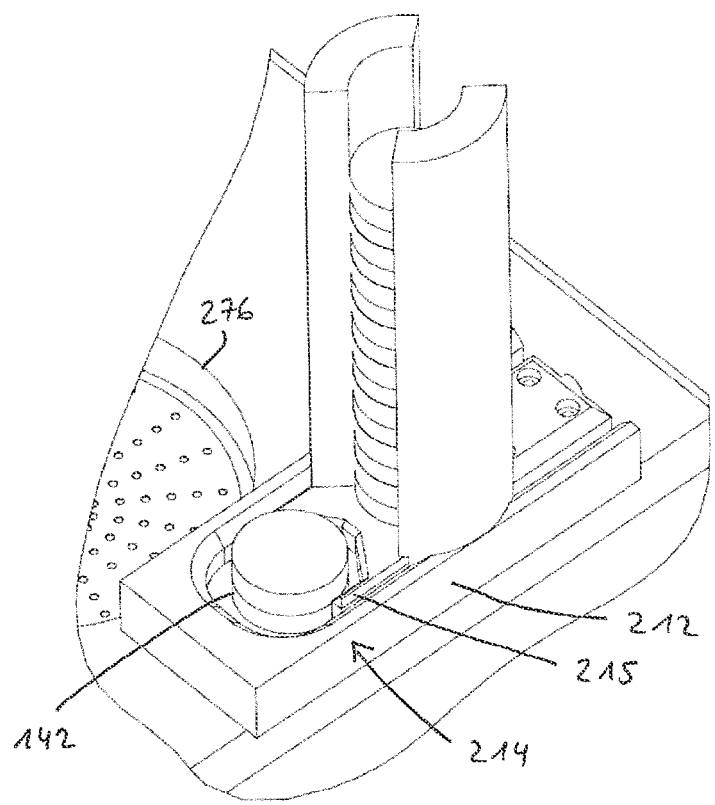
FIG. 14 is a sectional enlargement of the feed magazine from FIG. 13.

With reference to FIGS. 9 to 21, an example of a fully automated grinder and polisher 210 (grinding and polishing machine) is shown. The automated grinder and polisher 210 comprises a sample feeder 212 for feeding mounted samples 142, one at a time, to a sample removal position 214. The sample feeder 212 can be, for example, a sample chute, as shown in FIGS. 9 and 10, or a motor-driven conveyor with a stop 213 to define the sample removal position, as shown in FIGS. 11 and 12, or a sample magazine, as shown in FIGS. 13 and 14. The individual mounted samples 142 can thus be transported, collected or magazined by different solutions and can potentially be automatically transferred from an upstream mounting press 110.

With reference to FIGS. 9 and 10, the lowermost mounted sample 142 can optionally be pushed to the sample removal position 214 by a sample pusher 215. Alternatively, the lowermost portion of the sample chute, where the mounted sample 142 is ready for removal, may be configured to pivot so as to bring the mounted sample 142 into a horizontal position so that it can be gripped with the sample gripper 222. When the mounted sample 142 to be gripped is pivoted, the remaining mounted samples 142 are preferably retained on the sample chute to prevent them from slipping. This can be done, for example, with a separating stop. A separating stop 217 can also be used with a conveyor belt 212, in order to be able to better grip the individual mounted sample 142 in the sample removal position 214.

In the case of a sample magazine according to FIGS. 13 and 14, the lowermost sample can also be pushed into the sample removal position 214, for example, with the help of a sample pusher 215.

These sample feeders 212 or feeding devices have in common that they convey the mounted samples 142 individually, in particular one after the other successively into the sample removal position 214, so that the mounted sample 142 that is currently in that position can be removed and the next mounted sample 142 is automatically conveyed thereafter. Furthermore, the mounted samples 142 are generally, regardless of the type of sample feeder, preferably positioned horizontally in the sample removal position 214 to allow for a precise grip of the sample gripper 222.

The automated grinder and polisher 210 comprises a grinding and polishing head 216, which, in the present example, is suspended from a frame or bridge 218 and is movable on both the horizontal x-y-plane in both horizontal dimensions x and y. For this purpose, the grinding and polishing head 216 can be displaced in the x-direction along the frame 218 and the frame 218 is displaced by a linear guide 220 in the y-direction. Both are motor-driven and can be operated in a program-controlled manner. Accordingly, the grinder and polisher 210 illustrated here may be of a gantry design. Other movement mechanisms for the sample gripper such as with an extension arm may, however, be used as well.

The grinding and polishing head 216 comprises a sample gripper 222 configured to grip an individual mounted sample 142 without a sample holder. In the present example, the sample gripper 222 is configured as a three-finger gripper. The sample gripper 222 comprises radially movable gripping fingers 224—three in the present example—which grip the mounted sample 142 at its radial circumferential lateral surface 142c and hold said sample in a force-fit manner. The gripping fingers 224 comprise a step 226 or an inwardly pointing setoff, which forms a stop against the top 142b of the sample and ensures that the mounted sample 142 can be gripped by the sample gripper 222 as horizontally as possible.

Figure 19:
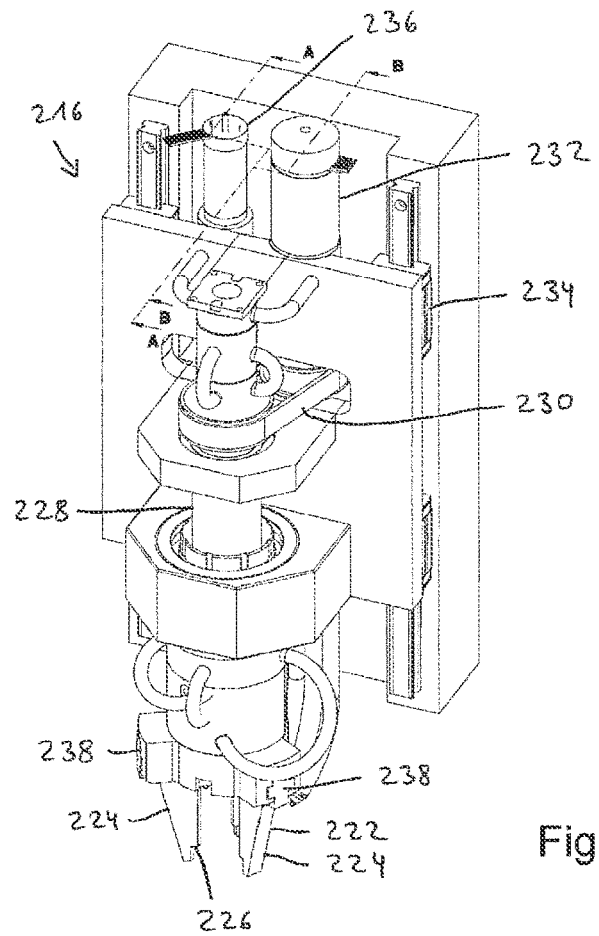
FIG. 19 is a three-dimensional representation of the grinding and polishing head without the housing.
Figure 20:
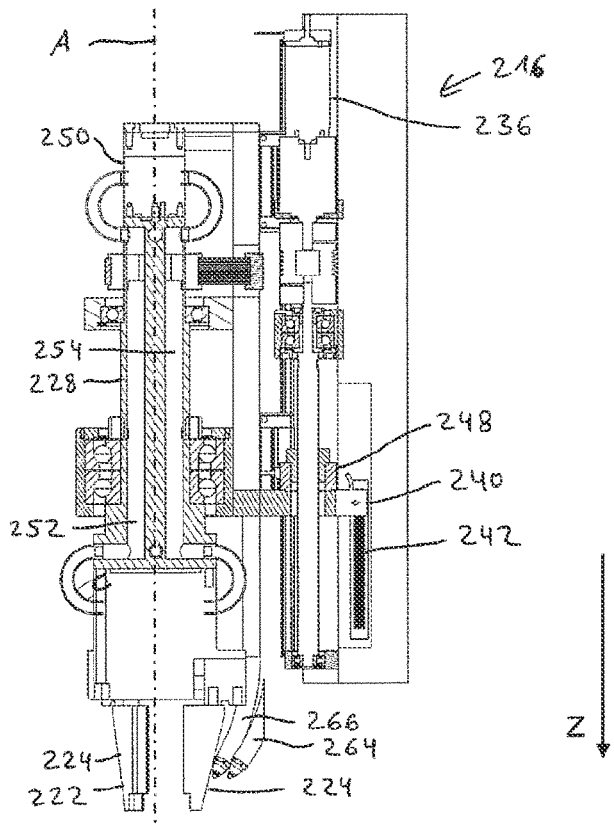
FIG. 20 is a vertical cross-sectional view through the grinding and polishing head along section line A-A in FIG. 19.
Figure 21:
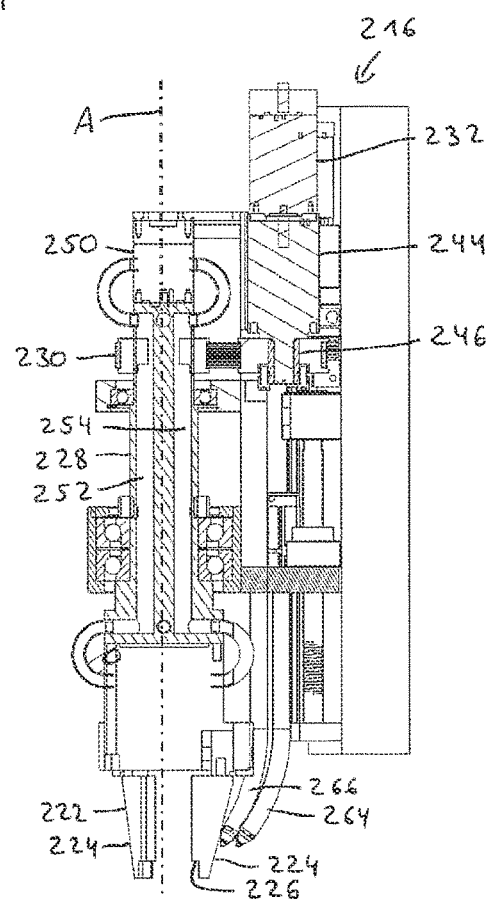
FIG. 21 is a vertical cross-sectional view through the grinding and polishing head along section line B-B in FIG. 19.
Figure 22:
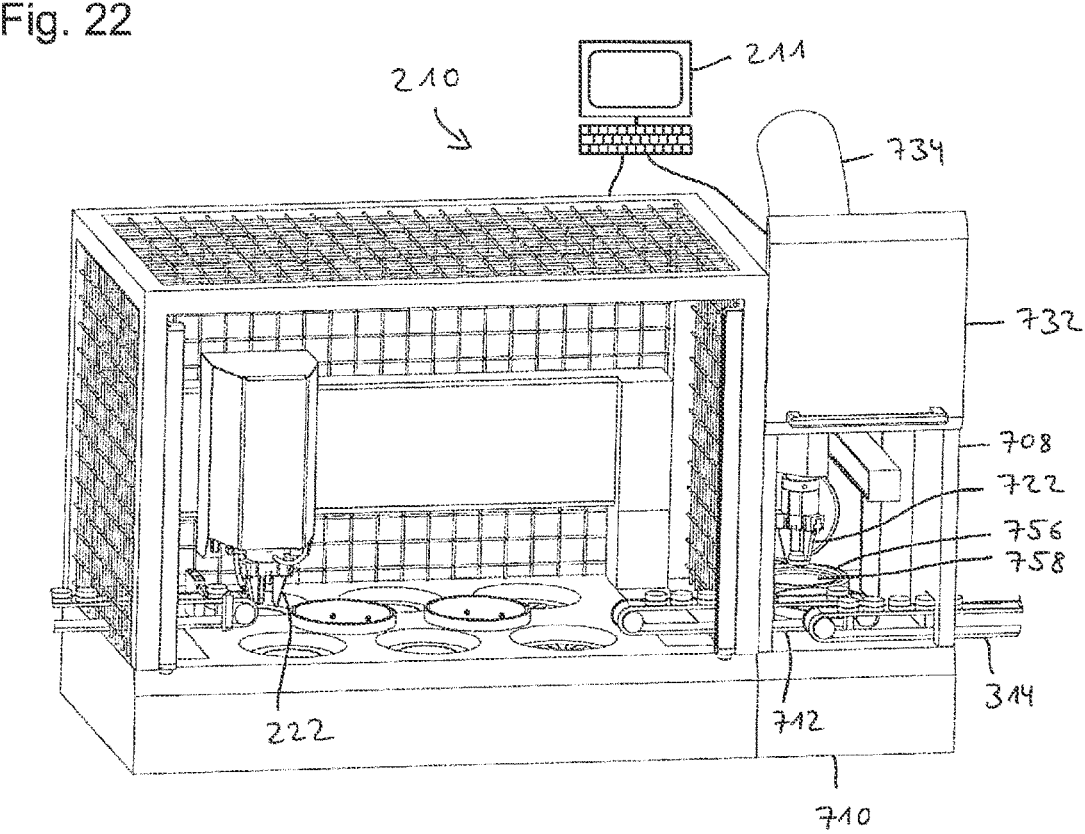
FIG. 22 is a three-dimensional representation of an automated grinder and polisher with an etching module.
Figure 23:
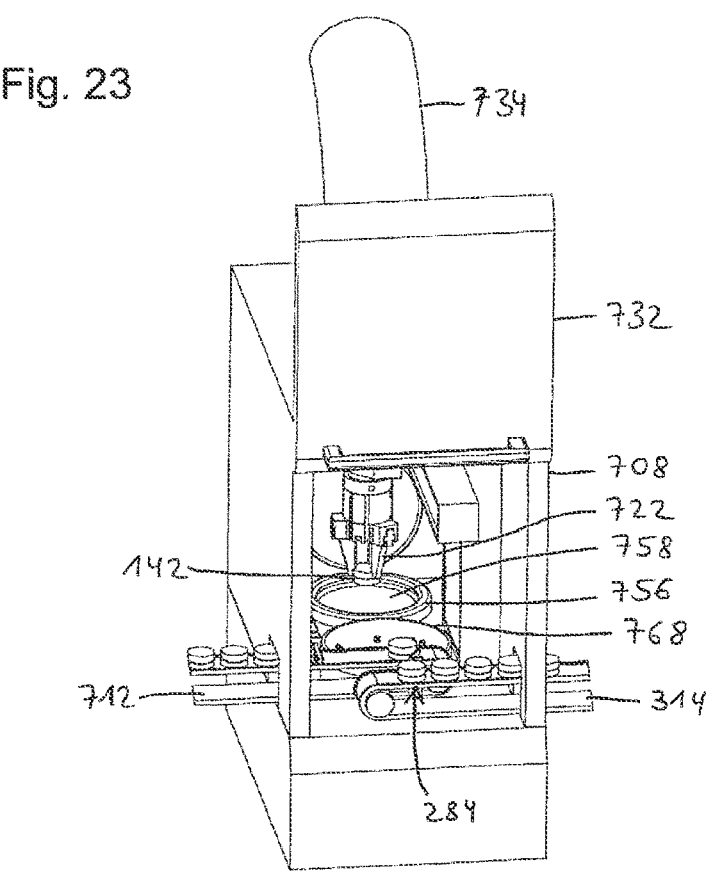
FIG. 23 is a three-dimensional representation of the etching module from FIG. 22.
Figure 24:
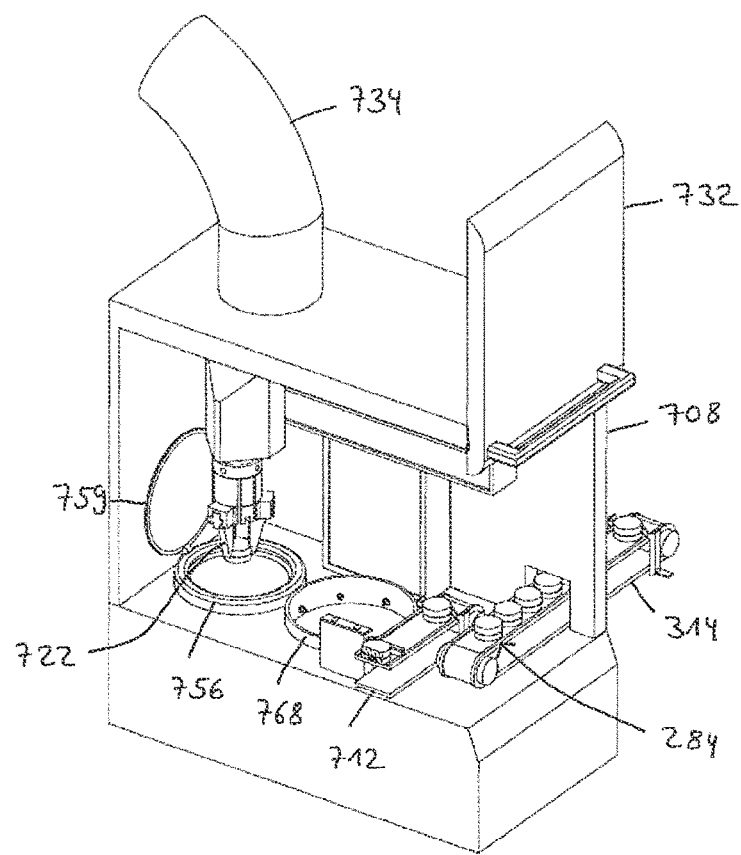
FIG. 24 is a three-dimensional representation of the etching module from FIG. 22.
Figure 25:
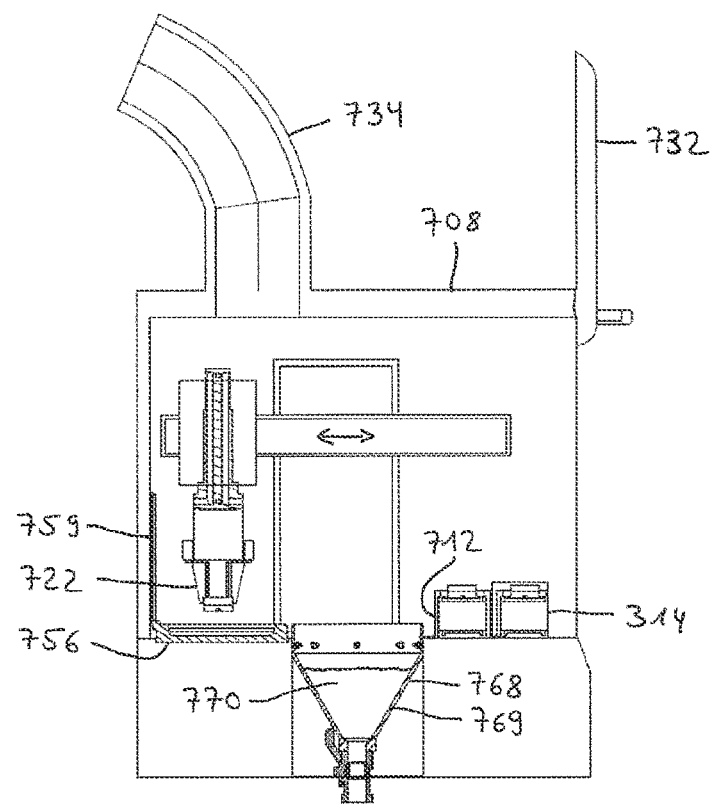
FIG. 25 is a schematic section through the etching module from FIG. 22.

With reference to FIG. 19-21, the sample gripper 222 is arranged at the lower end of a ball-bearing drive shaft 228, which is driven by a drive motor 232 via a belt drive 230 so that the sample gripper 222 rotates continuously at a predefined speed about its axis of symmetry A during grinding and polishing operations. The drive motor 232 for rotating the sample gripper 222 is coupled to the belt drive 230 via a gear 244 and a clutch 246. Furthermore, the grinding and polishing head 216 comprises a linear slide 234 by means of which the sample gripper 222 can be axially displaced in the z-direction, i.e. vertically, in order to position the gripped mounted sample 142 against the grinding discs or polishing discs. The axial displacement of the sample gripper 222 is automatically program-controlled and motor-driven by means of a motor 236 as well. In the present example, the drive shaft 228 is formed with two deep-hole bores 252, 254 for guiding pneumatic gas to and away from the sample gripper 222 in order to radially open and close the gripper along radial guides 238. For this purpose, each gripper finger 224 comprises a corresponding radial drive slide 238 and can be driven radially inward or outward to grip or release the mounted sample 142. Other drive mechanisms for the gripping fingers 224 to grip the mounted sample 142 are possible as well, however.

Accordingly, the mounted samples 142 do not have to be clamped in a sample holder, since they are gripped and held individually by means of the sample gripper 222, in the current case designed as a three-finger gripper. The sample gripper 222 rotates the gripped mounted sample 142 about the axis of symmetry of the mounted sample 142, which is coaxial with the axis of rotation A of the sample gripper 222. During the grinding process, both the grinding plate and the gripped mounted sample 142 rotate continuously in an axially offset manner, e.g. in the opposite or the same direction.

The linear travel of the sample gripper 222 in the z-direction is monitored by an optical probe 240 and an associated optical scale 242 to form a displacement measurement system 240, 242 for the displacement of the sample gripper 222 in the z-direction.

Furthermore, the grinding and polishing head 216 for the sample gripper 222 comprises a force sensor 248, by means of which the contact force of the mounted sample 142 gripped by the sample gripper 222 against the grinding disc or polishing disc can be measured. In one aspect, the force sensor 248 can be used to grind and polish at a predefined contact force, and the operator can enter the desired contact force into the program control 211 in advance. The force sensor 248 can also be used to detect the contact point of the mounted sample 142 as it is lowered onto the grinding disc, and then the displacement measurement system 240, 242 can be used to remove a predetermined amount of material previously entered by the operator into the program control device 211 in a program-controlled manner. Accordingly, the grinding and polishing head 216 detects the contact point of the mounted sample 142 on the grinding disc or polishing disc, measures the actual contact force, and/or may measure the axial travel distance of the sample gripper 222 in the z-direction during the grinding of the mounted sample 142 to supply one or more of these measured values to the program control device 211 in order to control the grinding operations and/or polishing operations with regard to the contact force and/or with regard to the layer thickness of the abrasive removal with a control circuit.

In other words, the z-axis of the grinding and polishing head 216 is equipped with a displacement measuring system 240, 242, which makes it possible to automatically remove a predetermined layer thickness from the mounted sample 142, which is specified in advance in the program control device 211 (target preparation). To determine the zero point during the target preparation, the force sensor 248 is used, which is able to detect when the gripped mounted sample 142 comes in contact with the respective grinding disc.

The gas for the pneumatic actuation of the gripper fingers 224 is fed to the drive spindle 228 via a rotary feedthrough 250, through which the pneumatic gas is fed to the linear slides 238 of the gripper fingers 224 via a gas supply 252. The pneumatic gas is discharged again via a gas discharge 254. Accordingly, the rotary feedthrough 250 in this example is designed as a two-channel rotary feedthrough for the pneumatic drive of the sample gripper 222.

With reference to FIGS. 9 to 12, one embodiment of the automated grinder and polisher 210 comprises four grinding stations 256, each grinding station 256 having a dedicated grinding plate 258, sometimes referred to as a spindle, and a tray 260 in which the respective grinding plate 258 rotates. Grinding debris and/or coolant may be collected in the grinding tray 260 and discharged via a drain.

A grinding wheel or grinding disc 262 is mounted on each grinding plate 258. Each of the four grinding stations 256 is preferably equipped with a different grinding disc with a different grit size, so that the sample gripper 222 holds the gripped mounted sample 142 in place during the entire grinding process and moves it from grinding station to grinding station to grind it successively first coarsely and then increasingly finely. In this process, the grinding discs 262 do not need to be changed between the grinding processes with different grit sizes, since there is a separate grinding station 256 for each desired grit size with the corresponding grinding disc 262, which the grinding and polishing head 216 and the sample gripper 222 move to with the gripped mounted sample 142. Accordingly, the grinding and polishing head 216 first moves to the sample removal position 214, where the sample gripper 222 is lowered and grips an individual, loosely mounted sample 142. The sample gripper 222 then moves back up and the grinding and polishing head 216 moves to the first grinding station 256, typically with the coarsest grinding disc 262. Once there, the sample gripper 222 is moved down in the z-direction until the gripped mounted sample 142 comes in contact with the grinding disc 262, which can be detected by the force sensor 248. Then, controlled by a control circuit, the first grinding process is performed under force and potentially a displacement control under a simultaneous rotation of the grinding disc 262 and the sample gripper 222. When the first grinding process is completed, the sample gripper 222 moves up again. Subsequently, the grinding and polishing head 216 preferably moves to a cleaning station 268. There, in this example, the sample gripper 222 moves back down to immerse the gripped mounted sample 142 in a cleaning bath. Subsequently, the sample gripper 222 moves upwards again. Then, the grinding and polishing head 216 with the sample gripper 222 preferably moves to the next grinding station 256 with a different grinding disc 262 and a different grit size, typically a finer grit, and the sample gripper 222 is lowered there again and the next grinding operation is performed, preferably in the same manner as described above. In the grinder and polisher 210 illustrated herein, up to four different grinding stations 256 with four correspondingly different grinding discs 262 can be successively accessed, preferably in the same manner.

Figure 17:
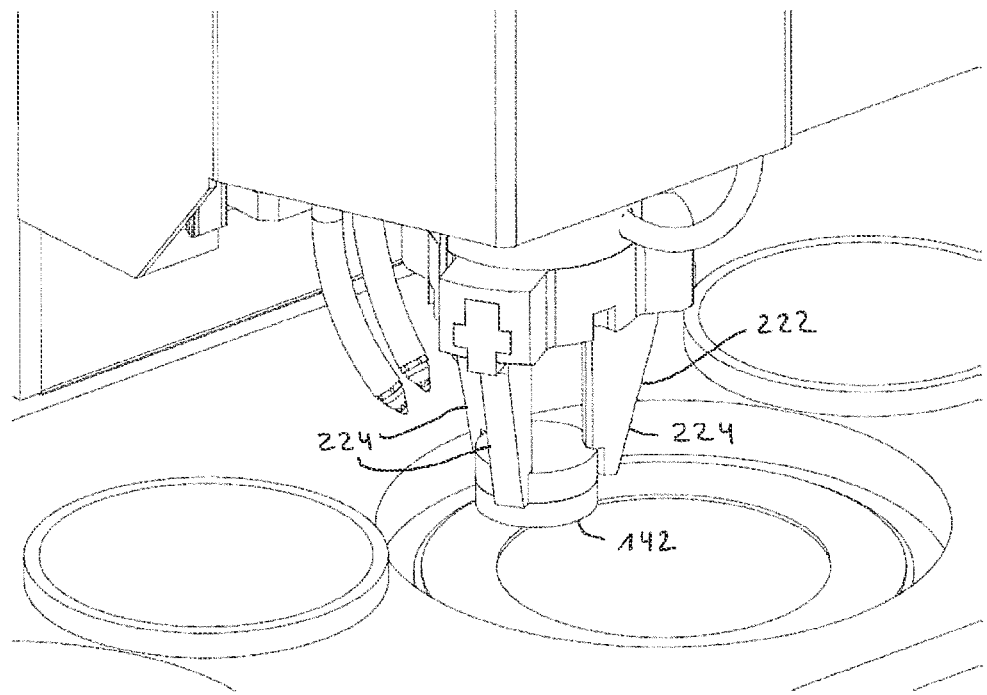
FIG. 17 is a three-dimensional representation of the grinding station from FIG. 16.

With reference to FIG. 17, the grinding and polishing head 216 comprises fluid nozzles 264, 266 in the present example. Cooling fluid is added via the fluid nozzle 264 during the grinding operation to perform a wet grinding process. The fluid nozzles 264, 266 are located on the grinding and polishing head 216 and are accordingly moved along with the sample gripper 222 and the gripped mounted sample 142 from grinding station 256 to grinding station 256 so that each grinding station 256 does not require its own cooling fluid nozzle. The cooling fluid, together with the grinding debris, can be discharged in a known manner via the respective grinding tray 260.

Figure 18:
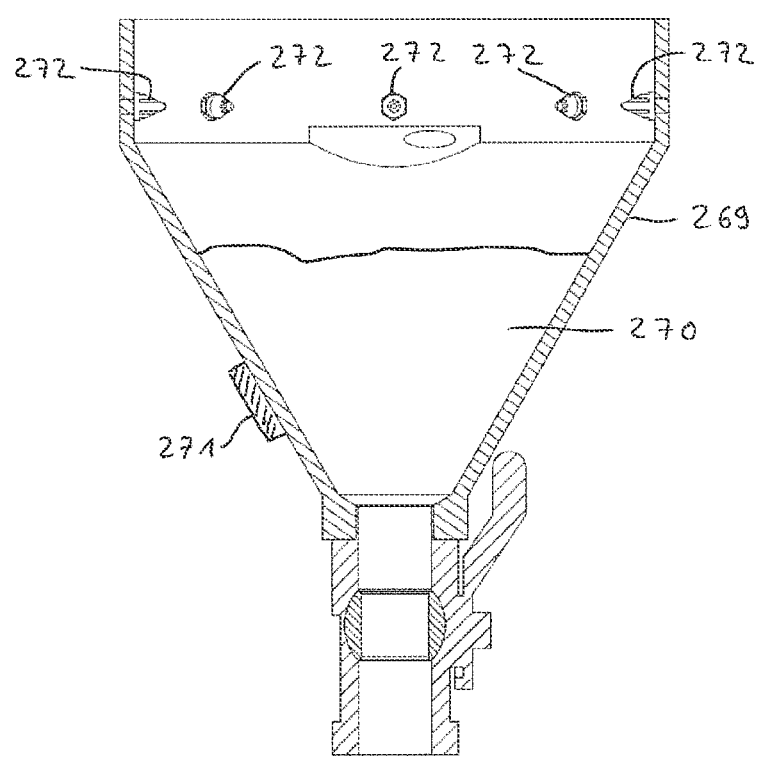
FIG. 18 is a vertical section through the cleaning bath.

With reference to FIGS. 9, 11 and 18, the automated grinder and polisher 210 comprises two cleaning stations 268 with cleaning containers 269 that the sample gripper 222 moves to between grinding operations. For this purpose, the grinding and polishing head 216 moves to the cleaning container 269 after the end of a grinding operation, which is filled with a cleaning liquid 270, and immerses the sample in the cleaning liquid 270 to rinse and clean said sample. Water or alcohol may, for example, be used as the cleaning fluid 270 in the cleaning stations 268. If desired, the sample gripper 222 with the mounted sample 142 may rotate during this process and/or an ultrasonic device 271 may be provided so that the cleaning station 268 is configured as an ultrasonic bath. The cleaning containers 269 can optionally be automatically emptied and filled with new cleaning liquid.

Air nozzles 272 are mounted radially in the upper region of the cleaning container 269 above the cleaning liquid 270, with which the mounted sample 142 can be dried with cold air and/or warm air after having been rinsed or cleaned. After sufficient cleaning, the sample gripper 222 then moves back up with the mounted sample 142 and the mounted sample 142 is blown dry by means of the air nozzles 272. After the cleaning process in the cleaning station 268, the sample gripper 222 can move to the next grinding station 256.

In the illustrated example, the automated grinder and polisher further comprises two polishing stations 276. Accordingly, the illustrated example comprises four grinding stations 256, two cleaning stations 268, and two polishing stations 276. It can be seen, however, that a different number and/or arrangement of stations 256, 268, 276 is possible as well, for example three grinding stations 256, two cleaning stations 268, and three polishing stations 276, or for example three grinding stations 256, two cleaning stations 268, and two polishing stations 276, as shown, for example, in FIG. 13, or any other desired number and/or arrangement. The polishing stations 276 each comprise a polishing plate 278, each of which is arranged in a polishing tray 280 and each of which comprises a polishing wheel or polishing disc 282 mounted thereon, wherein the polishing disc 282 may include a polishing cloth. When all desired grinding operations have been completed and the mounted sample 142 has been cleaned and rinsed after the last grinding operation, the grinding and polishing head 216 moves to the first polishing station 276 with the sample gripper 222 and the gripped mounted sample 142 for polishing the underside of the sample 142a with a first polishing agent. A polishing suspension for the polishing process can be dispensed through the fluid nozzle 266 of the grinding and polishing head 216. Preferably, the contact pressure is also feedback controlled during the polishing process by means of the force sensor 248 in order to carry out the polishing process with a defined contact pressure, which can be defined, for example, by the user in the program control device.

Accordingly, the cooling water for the grinding operations and/or the polishing suspensions for the polishing operations are supplied by the grinding and polishing head 216. Thus, the required fluids can be supplied by the grinding and polishing head 116 at each surface-processing station 256, 276 without having to be provided separately at each surface-processing station 256, 276. In other words, the fluid nozzles 264, 266 travel with the sample gripper 222 and the gripped mounted sample 142, respectively.

When the first polishing operation is completed at the first polishing station 276, the grinding and polishing head 216 moves with the sample gripper 222 and the gripped mounted sample 142 to a cleaning station 268 in order to be cleaned and rinsed as described above in connection with the grinding operations. It is convenient to use the first cleaning station 268 for the grinding operations and the second cleaning station 268 for the polishing operations, so that the grinding abrasion and polishing suspensions do not contaminate each other or the cleaning stations do not have to be refilled too often. After having cleaned and rinsed the mounted sample 142 in the second cleaning station 268, a second polishing station 276 may still be moved to a different polishing suspension in order to polish the sample with a different polishing medium, for example. The other polishing suspension may either be added via the same fluid nozzle 266, or additional fluid nozzles, e.g. 2, 3, 4, 5, 6 or more fluid nozzles for coolants and/or polishing suspensions may be provided on the grinding and polishing head 216 that move from station 256, 268, 276 to station 256, 268, 276 together with the sample gripper 222.

Accordingly, in the present example, a mounted sample 142 is gripped once by the sample gripper 222 and then successively ground consecutively in a plurality of grinding stations 256, in the present example in four grinding stations, with different grit sizes and rinsed and cleaned in a cleaning bath 268, 270 between the respective grinding operations. In addition, the same mounted sample 142 is polished consecutively by means of the same sample gripper 222 in one or more, in the present example two polishing stations 276 with different polishing agents. Again, the mounted sample 126 may be rinsed and cleaned in a cleaning station 268 between polishing operations. The entire grinding, polishing, and cleaning process is fully automated in a program-controlled manner and does not require any operator involvement.

In the examples shown, the samples are processed individually and are always held by the same sample gripper 222 as they pass through the respective stations 256, 276, 268.

The grinding and polishing head 216 can adjust the sample gripper 222 with the gripped mounted sample 142 in terms of height (z-axis) and press against the respective grinding disc 262 or against the respective polishing cloth or polishing disc 282, or immerse the sample into the respective cleaning container 269. Preferably, if the grinding and polishing head 216 is provided with the force sensor 248, the respective grinding disc 262 with the gripped mounted sample 142 can be probed and the force with which the gripped mounted sample 142 is pressed against the grinding disc 262 or the polishing disc 282 can be measured and controlled in a feedback control circuit by adjusting the measured value to a value previously set in the program control device 211.

At the end of the grinding and polishing processes, the grinding and polishing head 216 moves to a sample deposit position 284 and deposits the finished ground, polished and cleaned mounted sample 142 there, so that this mounted sample can be used immediately without any further processing steps, for example, for material analyses, such as hardness tests or microstructure analyses.

FIG. 9 schematically illustrates a sample deposit position 284 with a plurality of individual deposit positions. With reference to FIG. 11, the sample deposit position 284 is designed as part of a conveyor device, in the example as a motor-driven conveyor belt, by means of which the prepared mounted samples 142 are transported on to a sample collection device.

In FIGS. 9 and 11, the surface-processing stations, i.e. the grinding stations 256 and the polishing stations 276, are arranged in a rectangular 3×2 arrangement and the two cleaning stations 268 are located between the surface-processing stations 256, 276. The dimensions of the grinding and polishing machine 210 with the 3×2 arrangement are about 1.0 to 1.2 m in length and about 0.8 to 0.9 m in depth, so that it can be set up in a normal laboratory row (90 cm depth). The grinder and polisher 210 may also, however, be an integrated floor-standing unit, in which case the control system, the fluid storage tanks, the dispensing systems, etc., may be located below the grinder and polisher 210. The surface-processing stations 256, 276 are all located in the same device housing 208 from which the grinding/polishing head 216 is suspended, thus all are part of the same grinder and/or polisher 210.

A touch display integrated into the grinder and polisher 210 or attached by means of an adjustable support arm (not shown) may be used as the GUI.

According to FIG. 13, a substantially linear arrangement of the surface-processing stations 256, 276 and the cleaning stations 268 may be provided as well. The grinding/polishing head 216 only needs to be moved in one dimension (x). In return, the overall length of the grinder and polisher 210 becomes somewhat larger or fewer stations 256, 268, 276 will fit. As in the examples in FIGS. 9 and 11, a plurality of surface-processing stations 256, 276 having different processing grits are arranged side by side in the x-y plane to grind and/or polish the underside of the sample 142a in automated succession of a plurality of surface-processing steps in the respective different surface-processing stations 256, 276 with an increasing surface fineness. The number of surface-processing stations 256, 276 and cleaning stations 268 as well as their spatial arrangement in the x-y plane can be designed in accordance with the respective customer requirements.

Figure 15:
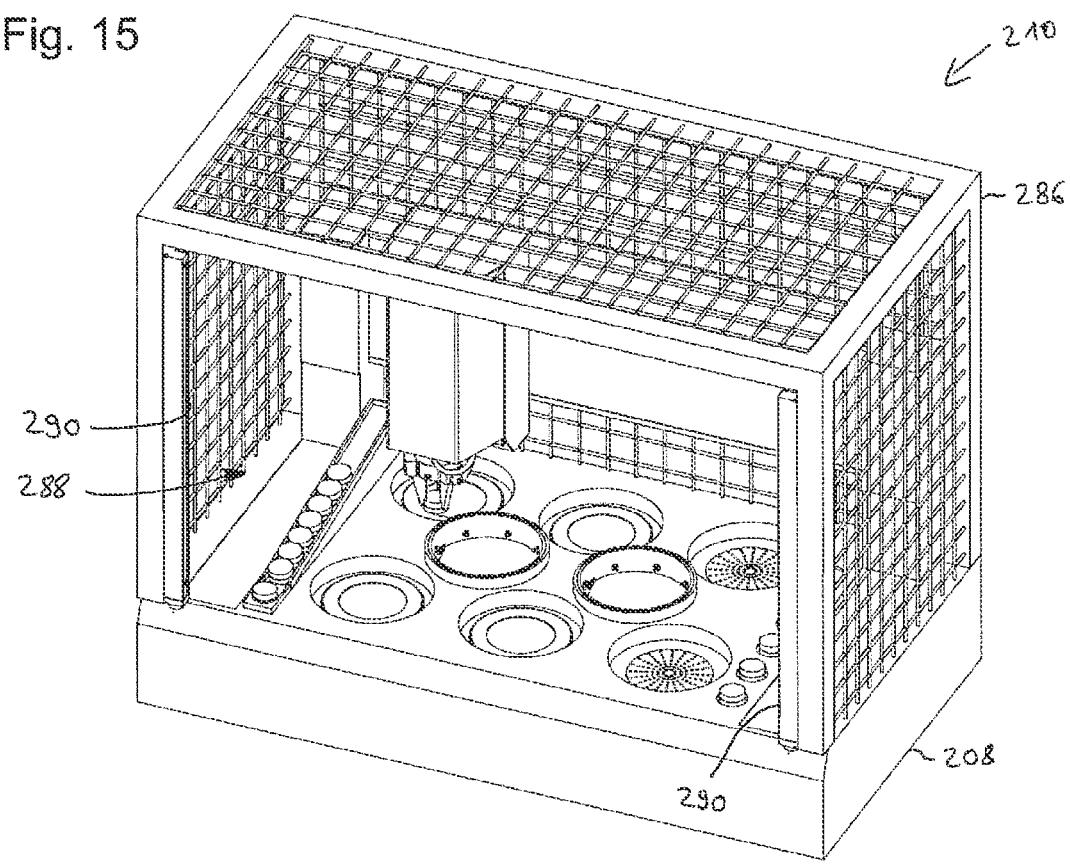
FIG. 15 is the grinder and polisher from FIG. 9 with a safety enclosure.
Figure 16:
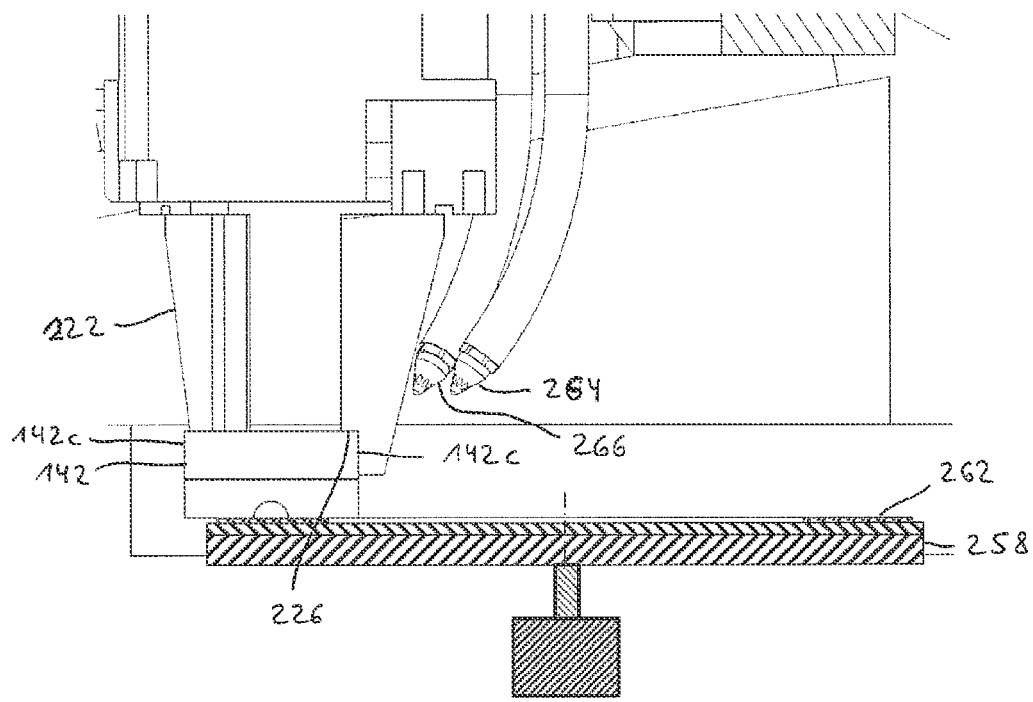
FIG. 16 is a partially sectional representation of a grinding station of the polisher and grinder from FIG. 15.

With reference to FIG. 15, the automated grinder and polisher device 210 may be enclosed in a safety enclosure 286 having a front engagement opening 288, the front engagement opening 288 being protected by means of a laser light curtain 290 as an engagement guard so that the grinder and polisher is automatically shut down if a person were to reach into the safety enclosure 286 during the operation.

Figure 30:
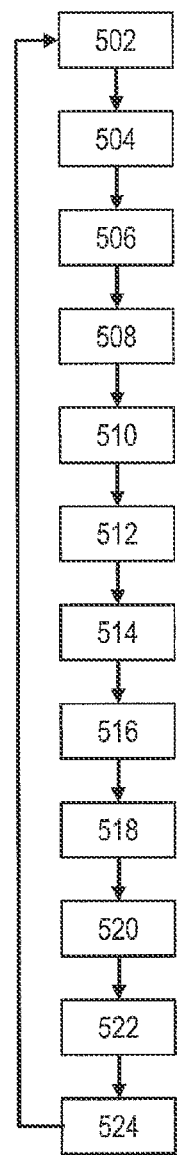
FIG. 30 is a process sequence for the grinding and polishing with a grinder and polisher according to FIG. 9 to FIG. 21.

FIG. 30 shows one embodiment of the grinding and polishing process comprising the following program-controlled process steps:

Step 502: Moving the grinding and polishing head 216 to a sample removal position 214 as well as lowering the sample gripper 222 and gripping the mounted sample 142 with the sample gripper 222 at the sample removal position 214.

Step 504: Moving to a first grinding station 256, and lowering the sample gripper 222 with the gripped mounted sample 142 and pressing the mounted sample 142 with a predefined pressing force onto a rotating first grinding disc 262 of the first grinding station 256 with a first grit size while rotating the sample gripper 222 and feeding coolant, as well as raising the sample gripper 222 with the gripped mounted sample 142.

If necessary, step 506: Moving to a first cleaning container 269 and immersing the mounted sample 142 gripped by the sample gripper 222 into the first cleaning container 269 as well as lifting the mounted sample 142 from the first cleaning container 269 and, if necessary, blow-drying the gripped mounted sample 142.

Step 508: Moving to a second grinding station 256, and lowering the sample gripper 222 with the gripped mounted sample 142 and pressing the mounted sample 142 with a predefined pressing force onto a rotating second grinding disc 262 of the second grinding station 256 with a second grit size while rotating the sample gripper 222 and feeding coolant, as well as raising the sample gripper 222 with the gripped mounted sample 142.

If necessary, step 510: Moving to the first or another cleaning container 269 and immersing the mounted sample 142 gripped by the sample gripper 222 into the first cleaning container 269 as well as lifting the mounted sample 142 from the first cleaning container 269 and, if necessary, blow-drying the gripped mounted sample 142.

Step 512: Moving to a third grinding station 256, and lowering the sample gripper 222 with the gripped mounted sample 142 and pressing the mounted sample 142 with a predefined pressing force onto a rotating third grinding disc 262 of the third grinding station 256 with a third grit size while rotating the sample gripper 222 and feeding coolant, as well as raising the sample gripper 222 with the gripped mounted sample 142.

If necessary, step 514: Moving to the first or another cleaning container 269 and immersing the mounted sample 142 gripped by the sample gripper 222 into the first cleaning container 269 as well as lifting the mounted sample 142 from the first cleaning container 269 and, if necessary, blow-drying the gripped mounted sample 269.

Step 516: Moving to a first polishing station 276, and lowering the sample gripper 222 with the gripped mounted sample 142 and pressing the mounted sample 142 with a predefined pressing force onto a rotating or vibrating first polishing disc 282 of the first polishing station 276 while rotating the sample gripper 222 and feeding a first polishing suspension, as well as raising the sample gripper 222 with the gripped mounted sample 142.

If necessary, step 518: Moving to a second or another cleaning container 269 and immersing the mounted sample 142 gripped by the sample gripper 222 into the first cleaning container 269 as well as lifting the mounted sample 142 from the first cleaning container 269 and, if necessary, blow-drying the gripped mounted sample 142.

Step 520: Moving to a second polishing station 276, and lowering the sample gripper 222 with the gripped mounted sample 142 and pressing the mounted sample 142 with a predefined pressing force onto a rotating or vibrating second polishing disc 282 of the second polishing station 276 while rotating the sample gripper 222 and feeding a second polishing suspension, as well as raising the sample gripper 222 with the gripped mounted sample 142.

If necessary, step 522: Moving to the second or another cleaning container 269 and immersing the mounted sample 142 gripped by the sample gripper 222 into the first cleaning container 269 as well as lifting the mounted sample 142 from the first cleaning container 169 and, if necessary, blow-drying the gripped mounted sample 142.

Step 524: Moving the grinding/polishing head 216 to a sample deposit position 284 as well as depositing the mounted sample 142 at the sample deposit position 284 with the sample gripper 222.

Program-controlled multiple repetition of steps 502-524.

The embodiment of the grinder and polisher 216 is characterized by the following:

- The mounted samples 142 may not need to be clamped in a sample holder.
- The entire grinding, polishing and cleaning process can be fully automated without any manual intervention.
- The grinder and polisher 210 is characterized by low investment costs that can be quickly amortized.
- The grinder and polisher 210 is characterized by compact dimensions and can be integrated into a conventional laboratory line.
- The grinder and polisher 210 can be used in a flexible manner.

With reference to FIG. 22-25, the grinder and polisher 210 may further comprise an etching station 756, comprising an etching bath 758 for etching the underside 142*a* of the ground and/or polished sample. In the example shown, the etching station 756 is mounted to the grinder and polisher 210 as a separate etching module 710, with an incoming and an outgoing conveying device 712, 314 transporting the mounted samples 142 to be etched. A sample gripper 722 grips one mounted sample 142 at a time, inserts it to the etching station 756, and immerses it in the etching bath 758. Subsequently, the sample gripper 722 conveys the etched mounted sample 142 to a cleaning station 768, where it immerses the mounted sample 142 in a cleaning bath consisting of a cleaning liquid 770 in a cleaning container 769. The sample gripper 722 then moves with the mounted sample 142 to a sample deposit position 284, in the example shown on the outgoing conveying device 314, and deposits the mounted sample 142 there.

The etching module 710 further comprises a gas-tight sealable housing 708 having a gas-tight door 732 and an exhaust 734 to remove the vapors from the etching bath 758. Furthermore, the etching bath 758 may be sealed with a lid 759 to prevent an excessive evaporation of acid in the etching bath 758.

In the example shown, the etching station 756 is attached to the grinder and polisher 210 in a separate etching module 710 and comprises a second sample gripper 722, which is preferably designed like the sample gripper 222. The etching station 756 may, however, also be integrated into the grinder and etcher 210 (not shown). Thus, the grinder/etcher 210 with an attached etching module 710 or with an integrated etching station 756 may also be referred to as the grinder/polisher and/or etcher 210.

3. Fully Automated Production Line

Figure 26:
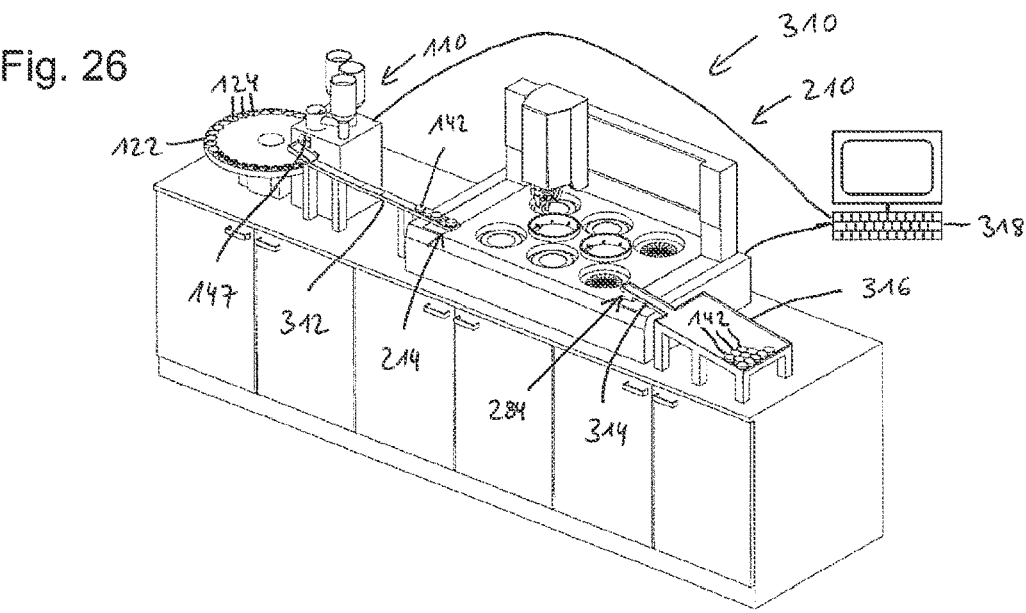
FIG. 26 is a three-dimensional representation of the fully automated mounting, grinding and polishing line on a laboratory floor unit.
Figure 27:
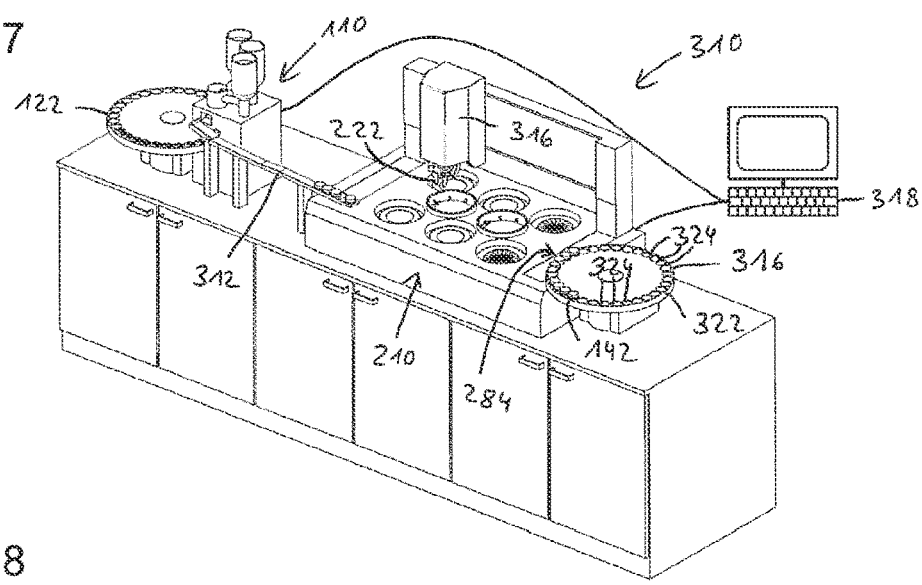
FIG. 27 is a three-dimensional representation of a further fully automated mounting, grinding and polishing line.
Figure 28:
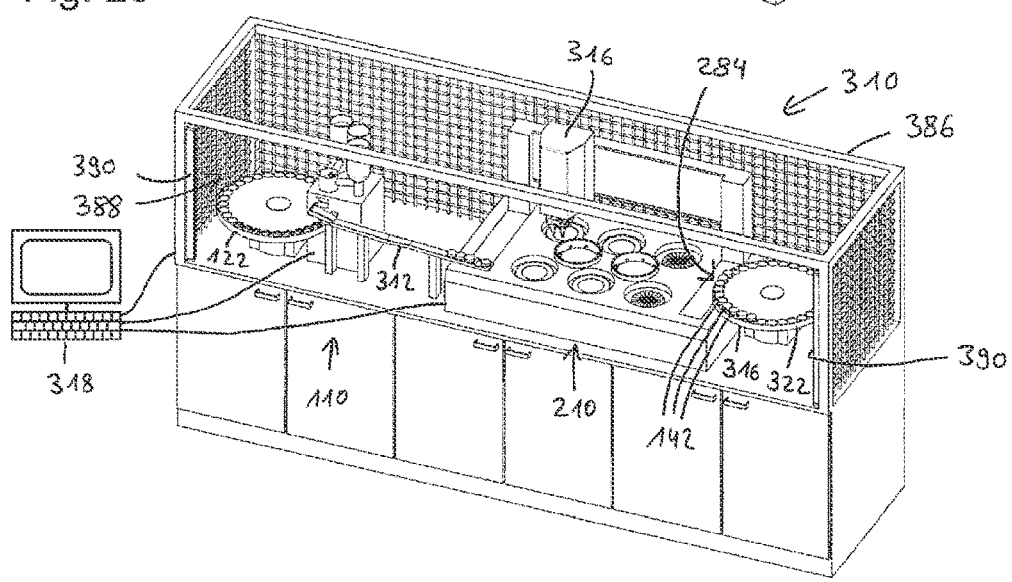
FIG. 28 is the grinder, polisher and etcher line from FIG. 27 with a safety enclosure.

FIG. 26-28 provides examples of fully automated production lines 310 for mounting, grinding and polishing samples. In particular, the automated production line 310 comprises the automated mounting press 110 described above and the automated grinder and polisher 210 described above.

The samples 142 mounted by the automated mounting press 110, which are ejected at the sample ejector 147 of the mounting press 110, are conveyed individually, i.e. not in a multiple sample holder, from the automated mounting press 110 to the automated grinder and polisher 210 by a first conveying device 312, in particular successively one after the other. For this purpose, the first conveying device 312 may be designed, for example, as a sample chute or motor-driven conveyor belt. Some of the mounted samples 142 may be buffered temporarily on the first conveying device 312. In any case, the first conveying device 312 conveys the mounted samples 142 to the sample removal position 214 of the automated grinder and polisher 210 so that the mounted samples 142 can be individually gripped there by the sample gripper 222 in succession to undergo the grinding operations, the polishing operations and/or cleaning operations described above. When a mounted sample 142 has been completely finished in this process, it is deposited by the sample gripper 222 at the sample deposit position 284.

In the example shown in FIG. 26, the finished mounted sample 142 is conveyed from the sample deposit position 284 by means of a second conveying device 314 individually, i.e. not in a multiple sample holder, to a sample collection device 316, in particular successively one after the other. The second conveyor device 314 can also be designed, for example, as a chute or motor-driven conveyor belt. Thus, the finished mounted samples 142 are fed one after the other to the sample collection device 316, so that all samples 126 to be mounted that have passed through the automated production line 310, are present in the sample collection device 316 in an individually mounted and finished condition and ready to be sent by the operator to their further destination.

If the finished (ground, polished and/or etched) mounted samples 142 are to slide on a chute, the finished mounted samples 142 are preferably either turned over beforehand or the chute can be cleared at its center so that the finished mounted samples 142 rest only on the outer edge. This can prevent the polished underside of the sample 126 from being damaged, for example by scratches.

With reference to FIGS. 27 and 28, the sample collection device 316 can be designed as a magazine 322 with a plurality of sample deposit locations 324, wherein, in each case, an individual, finished, mounted sample 142 is deposited at a sample deposit location 324 of the magazine 322. The magazine 322 can be designed to be movable, for example as a sample deposit table, in particular with sample deposit locations 324 arranged next to one another, wherein one free sample deposit location 324 at a time is moved to the sample deposit position 284 in a program-controlled manner, so that each finished mounted sample 142 can be deposited at that free sample deposit location 324 which is located at that time in the sample deposit position 284 of the grinder and polisher 210. In the next cycle, the next free sample deposit location 324 is then moved to the sample deposit position 284. In other words, the sample deposition on the sample deposit locations 324 with the sample gripper 222 is synchronized with the grinding and/or polishing process or in the sample processing cycle of the automated grinder and polisher 210. In the example shown in FIGS. 27 and 28, the sample collection device 316 comprises as a table-shaped magazine 322 a rotary table with, for example, 32 peripheral sample deposit locations 324 corresponding to the sample loading table 122. Of course, an etching module 710 can also be comprised here.

In a preparatory step, the operator thus places all the samples 126 to be mounted at a respective loading position 124 of the sample loading table 122 and then starts the fully automated production line 310, in which the samples are first automatically mounted by the mounting press 110 in a program-controlled manner, conveyed by the first conveying device 312 to the grinder and polisher 210, ground, polished and cleaned there, and then conveyed by the second conveying device 314 to the sample collection device 316 or deposited there. The preparatory loading step can be carried out by the operator, for example, in the evening, and after a fully automated program-controlled run, all the samples are mounted and finished the next morning, i.e. ground, polished and cleaned, and individually provided in the sample collection device 316. Throughout the production process, the mounted samples 142 are individually and loosely handled, for example, conveyed, gripped, ground, polished, cleaned, etched and/or stored at their final destination.

The entire production line 310 may be controlled by program control devices 111, 211 that run, for example, on a central computer 318.

The dimensions of the production line 310 are less than 4.8 m in length and less than 90 cm in depth. so that it can be set up in a normal laboratory row (90 cm depth).

With reference to FIG. 28, the production line 310 may be enclosed in a safety enclosure 386, with a front engagement opening 388 monitored by a laser light curtain 390 to provide an emergency shutdown.

Figure 31:
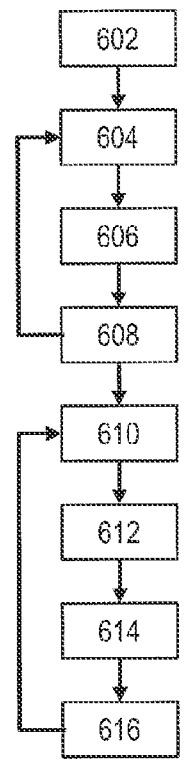
FIG. 31 is a process sequence for the creation of mounted samples with a production line according to FIG. 26 to FIG. 28.

With reference to FIG. 31, one embodiment of the automated process for producing a plurality of mounted and surface-treated samples 142 comprises, in a step 602, the provision of a plurality of samples 126 to be mounted and the following program-controlled process steps:

Step 604: Hot-mounting a sample 126 to be mounted with mounting material 117 in a press cylinder 132 of a mounting press 110 to produce a mounted sample 142.

Step 606: Ejecting the mounted sample 142 from the press cylinder 132.

Step 608: Conveying the mounted sample 142 from the mounting press 110 to a surface-processing device 210.

Step 610: Gripping an individual mounted sample 142 with a sample gripper 222 of the surface-processing device 210.

Step 612: Moving the sample gripper 222 to a surface-processing station 256, 276 of the surface-processing device 210 to process the underside 142*a* of the mounted sample 142 in the surface-processing station 256, 276 and, if necessary, moving the sample gripper 222 to a cleaning station 268 of the surface-processing device 210 to clean the mounted sample 142.

If necessary, step 614: Repeating step 612 one or more times at other surface-processing stations 256, 276 of the surface-processing device 210 and, if necessary, at other cleaning stations 268 of the surface-processing device 210.

Step 616: Moving the sample gripper 222 to a sample deposit position 284 and opening the sample gripper 222 to release and deposit the mounted finished sample 142 at the sample deposit position 284.

Program-controlled multiple repetition of steps 604-608 and steps 610-616, with the mounted samples being able to be buffered between steps 608 and 610.

In summary, the present disclosure relates to an automated mounting press 110, an automated grinder and polisher 210, as well as an automated production line 310 comprising a mounting press 110 and a grinder and polisher 210. Therefore, all features described in connection with the mounting press 110 and the grinder and polisher 210 are also considered disclosed for the production line 310 and vice versa. All features disclosed in connection with the mounting press are also considered disclosed for the associated method and vice versa. All features disclosed in connection with the grinder and/or polisher are also considered disclosed for the associated method and vice versa. All features disclosed in connection with the production line are also considered disclosed for the associated method and vice versa.

It is obvious to a person skilled in the art that the embodiments described above are to be understood as and that the present disclosure is not limited to these, but can be varied in a number of ways without departing from the scope of protection of the claims. Furthermore, it is obvious that the features, whether they are disclosed in the description, the claims, the figures or otherwise, also individually define components of the present disclosure, even if they are described together with other features.

The invention claimed is:

1. A mounting press for mounting samples in mounting material, comprising:
   a pressing unit with a press cylinder,
   a feeding device for feeding mounting material,
   a sample loading table having a plurality of loading stations, on each of which the operator can place a sample to be mounted,
   a control device adapted to control the mounting press with the following steps:
   a) the sample loading table moves one of the loading stations with one of the samples to be mounted to a sample receiving position of the pressing unit,
   b) the sample to be mounted is introduced from the sample receiving position into the press cylinder by a plunger drive and the mounting material is fed into the press cylinder,
   c) the mounting operation is performed to produce a mounted sample,
   d) the thus mounted sample is ejected upwards out of the press cylinder by the plunger drive, and
   steps a) to d) are repeated to mount a plurality of samples.

2. Mounting press according to claim 1,
   wherein the sample loading table is in the form of a rotary table and the loading stations are arranged circumferentially in a peripheral annular region of the rotary table.

3. Mounting press according to claim 1,
   wherein the press cylinder comprises a lower first and an upper second opening and the sample is introduced into the press cylinder through the lower first opening and the mounting material is fed into the press cylinder through the upper second opening,
   wherein the pressing unit comprises an upper closure slide, and the control device is adapted to control the upper closure slide such that the upper closure slide closes the upper second opening of the press cylinder after the mounting material has been fed in, in order to subsequently be able to carry out the pressing process.

4. Mounting press according to claim 1,
   wherein a plunger is located in each of the loading stations as a placement surface for the sample to be mounted and the pressing unit comprises the plunger drive, and wherein the plunger drive couples to the respective plunger in the sample receiving position in order to lift the plunger with the sample to be mounted out of the loading station and push it into the press cylinder.

5. Mounting press according to claim 4,
   wherein the mounted sample is driven upwards out of the press cylinder by the plunger drive after the pressing process and the plunger and the pressing unit comprises a sample ejector which ejects the mounted sample driven upwards out of the press cylinder from the pressing unit, wherein the sample ejector pushes the mounted sample transversely to the axis of the press cylinder from the upwardly driven plunger to eject the mounted sample.

6. Mounting press according to claim 4,
wherein, after ejection of the mounted sample, the plunger drive moves down again with the plunger and the empty plunger is deposited again in the loading station of the sample loading table before the next loading station with the next plunger and the next sample is moved to the sample receiving position to start the next cycle.

7. Mounting press according to claim 1,
wherein the mounting press comprises an insertion opening under the press cylinder, in which the sample loading table moves at least partially and cyclically inserts, at the loading stations, the samples to be mounted into the insertion opening one after the other in order to move one sample to be mounted under the press cylinder.

8. Mounting press according to claim 1,
wherein at least a first and a second storage container for storing different first and second mounting material are connected to the feeding device, so that the feeding device can feed mounting material from both the first and the second storage container into the press cylinder, and wherein the feeding of the first and second mounting material is controlled by the control device in order to automatically feed the first and/or second mounting material into the press cylinder, in each case in a predefined quantity.

9. Method for mounting a plurality of samples in mounting material with a mounting press, wherein a sample loading table comprising a plurality of loading stations is loaded with a plurality of samples to be mounted, and the samples are subsequently automatically mounted one after the other in a program-controlled manner by a control device in clock cycles with the following clock steps:
a) the sample loading table moving a loading station with a sample to be mounted to a sample receiving position of a pressing unit having a press cylinder
b) introducing the sample from step a) from the sample receiving position into the press cylinder of the pressing unit by a plunger drive and feeding mounting material from a feeding device into the press cylinder,
c) pressing the mounting material and the sample in the press cylinder to produce a mounted sample,
d) ejecting the mounted sample upwards out of the press cylinder by the plunger drive,
wherein the clock cycle is repeated with the clock steps a) to d) to mount a plurality of samples.

10. Method according to claim 9,
wherein the samples are introduced into the press cylinder from below and the mounting material is fed into the press cylinder from above,
wherein the press cylinder is closed at its upper end in a program-controlled manner after the mounting material has been fed in, in order to subsequently carry out the pressing process automatically in a program-controlled manner.

11. Method according to claim 9,
wherein the samples to be mounted are each deposited on their own plunger at the loading stations and the samples together with their own plunger are each inserted axially from below into the press cylinder.

12. Method according to claim 11,
wherein, after the pressing process, the mounted sample is moved upwardly out of the press cylinder and is pushed from the plunger by a sample ejector transversely to the axis of the press cylinder to eject the mounted sample.

13. Method according to claim 11,
wherein, after ejection of the mounted sample, the empty plunger moves down again and is deposited again in the loading station before the next loading station with the next plunger and the next sample is moved to the sample receiving position to start the next cycle.

14. Method according to claim 11,
wherein the sample loading table cyclically moves the loading stations with the plungers and the samples to be mounted deposited thereon under the press cylinder, in order to axially introduce one of the plungers with the sample deposited thereon into the press cylinder and/or wherein, after the pressing operation, the plunger is again moved axially downwards out of the press cylinder and deposited again on the loading station before, in the next cycle, the next loading station with the next plunger and the next sample moves under the press cylinder.

15. Method according to claim 9,
wherein at least two different mounting materials are automatically and successively fed into the press cylinder in a program-controlled manner.

16. Production line for automated mounting and subsequent surface finishing of samples, comprising:
the automated mounting press according to claim 1 for the program-controlled mounting and ejection of a plurality of samples in sequence,
an automated surface-processing device for processing the underside of the plurality of samples mounted by the mounting press in sequence in a program-controlled manner, and comprising a sample removal position and a sample deposit position,
a first conveying device for conveying the mounted samples ejected from the automated mounting press to the sample removal position of the surface-processing device,
program control devices for controlling the automated mounting press and the automated surface-processing device.

17. Production line according to claim 16, comprising a sample collection device for collecting the plurality of samples mounted by the mounting press and processed by the surface-processing device.

18. Production line according to claim 17, comprising a second conveying device for conveying the mounted samples processed by the surface-processing device from the sample deposit position to the sample collection device.

19. Method for producing a plurality of mounted samples with a ground and/or polished underside with the production line according to claim 16 with the following steps, or with the interposition of further steps:
a) providing a plurality of samples to be mounted at a mounting press,
b) pressing a first sample to be mounted with mounting material in a press cylinder of the mounting press to produce a mounted sample,
c) ejecting the first mounted sample from the press cylinder,
d) conveying the first mounted sample from the mounting press to a surface-processing device,
e) gripping the individual first mounted sample with a sample gripper of the surface-processing device, f) moving to a processing station of the surface-processing device, with the sample gripper for processing the underside of the first mounted sample in the processing station, g) moving to a sample deposit position with the sample gripper and depositing the first mounted sample at the sample deposit position, h) repeating steps b) through d) and e) through g) a number of times to produce a plurality of mounted samples with a surface processed underside.

20. A mounting press for mounting samples in mounting material comprising:

a pressing unit with a press cylinder and having a sample receiving position;

a feeding device for feeding mounting material;

a sample loading table having a plurality of loading stations, on each of which the operator can place a sample to be mounted;

a control device including a program control adapted to automatically control at least the sample loading table, the pressing unit, and the feeding device, so as to carry out a plurality of mounting press operations automatically and sequentially one after the other without intermediate operator intervention, after the sample loading table has been loaded with a plurality of samples to be embedded, wherein the control device is adapted to automatically control the mounting press in a plurality of sequential cycles, each including the following steps:

a) the sample loading table moves one of the loading stations with one of the samples to be mounted to the sample receiving position of the pressing unit, b) the sample to be mounted is introduced from the sample receiving position into the press cylinder and the mounting material is fed into the press cylinder, c) the mounting operation is performed to produce a mounted sample, and d) the thus mounted sample is ejected upwardly out of the press cylinder, wherein steps a) to d) are repeated by the program control to sequentially mount the plurality of samples.

\* \* \* \* \*